(12) United States Patent
Mulawski

(10) Patent No.: US 11,128,158 B2
(45) Date of Patent: Sep. 21, 2021

(54) BATTERY MANAGEMENT SYSTEM AND RELATED TECHNIQUES FOR ADAPTIVE, DYNAMIC CONTROL OF BATTERY CHARGING

(71) Applicant: Servato Corporation, New Orleans, LA (US)

(72) Inventor: Steven A. Mulawski, Tyngsborough, MA (US)

(73) Assignee: Servato Corp., New Orleans, LA (US)

( * ) Notice: Subject to any disclaimer, the term of this patent is extended or adjusted under 35 U.S.C. 154(b) by 863 days.

(21) Appl. No.: 15/454,183

(22) Filed: Mar. 9, 2017

(65) Prior Publication Data

US 2017/0264123 A1 Sep. 14, 2017

Related U.S. Application Data

(60) Provisional application No. 62/305,787, filed on Mar. 9, 2016.

(51) Int. Cl.
*H02J 7/00* (2006.01)
*H02J 9/06* (2006.01)

(52) U.S. Cl.
CPC .......... *H02J 7/0063* (2013.01); *H02J 7/0014* (2013.01); *H02J 7/0021* (2013.01); *H02J 7/0029* (2013.01);
(Continued)

(58) Field of Classification Search
CPC ...... H02J 7/0063; H02J 7/0021; H02J 7/0072; H02J 7/00; H02J 7/0014; H02J 7/0031;
(Continued)

(56) References Cited

U.S. PATENT DOCUMENTS

| 5,703,471 A | * | 12/1997 | Bullock | ............... | H01M 10/46 320/134 |
| 6,304,059 B1 | * | 10/2001 | Chalasani | ............ | H02J 7/0018 320/118 |

(Continued)

OTHER PUBLICATIONS

Eltek Valere, "Smartpack Controller;" Monitoring and Control Unit; Additional Technical Specifications; www.eltekvalere.com; Jan. 1, 2016; 2 Pages.

(Continued)

*Primary Examiner* — Richard Isla
*Assistant Examiner* — Dung V Bui
(74) *Attorney, Agent, or Firm* — Daly, Crowley, Mofford & Durkee, LLP

(57) ABSTRACT

A battery management circuit and method for managing a power supply and one or more battery strings includes a current sensing circuit and a battery measurement circuit. The current sensing circuit is configured to: receive a current signal from at least one of the battery strings at a first terminal of the current sensing circuit; measure a magnitude of the current signal; and provide a current sensing signal indicative of the magnitude of the current signal at a third terminal of the current sensing circuit. The battery measurement circuit is configured to: receive a current sensing signal at a third terminal of the battery management circuit; measure one or more characteristics of the at least one of the battery strings; and provide a power supply control signal at a first terminal of the battery measurement circuit.

21 Claims, 13 Drawing Sheets

(52) U.S. Cl.
CPC .......... *H02J 7/0031* (2013.01); *H02J 7/0047* (2013.01); *H02J 7/0072* (2013.01); *H02J 9/062* (2013.01); *H02J 7/0048* (2020.01); *H02J 2007/0067* (2013.01)

(58) Field of Classification Search
CPC ...... H02J 7/0029; H02J 7/0047; H02J 7/0062; H02J 2007/0067; H02J 2007/005
USPC ......................................................... 320/116
See application file for complete search history.

(56) References Cited

U.S. PATENT DOCUMENTS

| | | | | |
|---|---|---|---|---|
| 7,378,819 B2 * | 5/2008 | Wang | ............... | H02J 7/0071 320/121 |
| 2002/0014880 A1 * | 2/2002 | McAndrews | ......... | H02J 7/0013 320/134 |
| 2006/0132089 A1 * | 6/2006 | Ambrosio | ............. | H02J 7/0014 320/107 |
| 2007/0120534 A1 * | 5/2007 | Arai | ................... | G01R 31/389 320/133 |
| 2008/0084117 A1 * | 4/2008 | Sander | .................. | H02J 3/385 307/46 |
| 2008/0218130 A1 * | 9/2008 | Guo | ..................... | H01M 10/441 320/162 |
| 2010/0305770 A1 * | 12/2010 | Bhowmik | ............... | B60L 58/18 700/295 |
| 2011/0006603 A1 * | 1/2011 | Robinson | .................. | H02J 1/00 307/31 |
| 2013/0320772 A1 * | 12/2013 | Qiao | .................... | H01M 10/04 307/87 |
| 2014/0070618 A1 * | 3/2014 | Bajaj | ..................... | H02J 7/0029 307/66 |
| 2015/0219706 A1 * | 8/2015 | Loftus | ..................... | B60L 58/20 324/503 |
| 2016/0049813 A1 * | 2/2016 | Takizawa | ............... | H02J 7/0021 320/112 |

OTHER PUBLICATIONS

Eltek, "Smartpack Controller;" Monitoring and Control Unit; Data Sheet, Doc 242100.100.DS3—rev9; www.eltek.com; Jan. 2012; 4 Pages.
Eltek, "Battery Functions;" PowerSuite Online Help, 356807.063_3v3d_2012-02; Feb. 2012; pp. 294-322; 29 Pages.

* cited by examiner

BATTERY MANAGEMENT SYSTEM AND RELATED TECHNIQUES FOR ADAPTIVE, DYNAMIC CONTROL OF BATTERY CHARGING

CROSS REFERENCE TO RELATED APPLICATION

This application claims the benefit under 35 U.S.C. § 119(e) of U.S. Provisional Application No. 62/305,787 filed Mar. 9, 2016, which application is incorporated herein by reference in its entirety.

FIELD

This disclosure relates generally to circuits, and, more particularly, to battery management circuits and related techniques for managing one or more batteries in a circuit or system.

BACKGROUND

As is known in the art, a battery management circuit is an electronic circuit that manages a battery, such as by protecting the battery from operating outside its safe operating area, monitoring its state, calculating secondary data, reporting that data, controlling its environment, authenticating it and/or balancing it.

SUMMARY

In accordance with the concepts, systems, circuits and techniques sought to be protected, described herein is a battery management circuit having an intelligent switch function.

In particular, described herein is the use of a metal oxide semiconductor field effect transistor (MOSFET) disposed between a power supply (e.g., a direct current (DC) power supply) and at least one battery (e.g., at least one battery in a battery pack) and configured to act as a switch. The MOSFET has electrical characteristics selected such that in a first bias state the MOSFET isolates the at least one battery (e.g., a backup battery, or an array of batteries) from the power supply and a load (e.g., an electrical load) such that battery open circuit (OC) behavior of the at least one battery can be evaluated, while concurrently maintaining an uninterrupted current flow from the at least one battery to the load, in the event the power supply fails to provide sufficient power to the load.

In one aspect of the concepts described herein, in a system including a power supply configured to generate a supply voltage, an electrical load configured to receive the supply voltage, and a battery pack comprising at least one battery, a battery management circuit for managing the battery pack has first and second terminals configured to be coupled to first and second opposing terminals of the power supply and first and second opposing terminals of the electrical load. The battery management circuit also has third and fourth terminals configured to be coupled to first and second opposing terminals of the at least one battery. The battery management circuit includes a switching circuit having a first terminal coupled to the first terminal of the battery management circuit, a second terminal, and a third, control terminal. The first and second terminals of the switching circuit correspond to current conducting terminals of the switching circuit.

The battery management circuit also includes a current sensing circuit having a first terminal coupled to the second terminal of the switching circuit, a second terminal coupled to the control terminal of the switching circuit, and a third terminal coupled to the third terminal of the battery management circuit. The current sensing circuit is configured to receive a current signal from the switching circuit, measure a direction of the current signal, and provide a current sensing signal indicative of the direction of the current signal in response thereto at the second terminal of the current sensing circuit.

The battery management circuit additionally includes a battery measurement circuit having a first terminal coupled to the control terminal of the switching circuit. The battery measurement circuit also has at least a second terminal coupled to the first and second terminals of the at least one battery. The battery measurement circuit is configured to measure one or more characteristics of the at least one battery and provide a battery measurement signal in response thereto at the first terminal of the battery measurement circuit. A switch control signal based upon the current sensing signal and the battery measurement signal is provided to the control terminal of the switching circuit and thus controls current flow through the current conducting terminals of the switching circuit.

The battery management circuit may include one or more of the following features individually or in combination with other features. The one or more characteristics measured by the battery measurement circuit may include open circuit voltage and/or open circuit voltage behavior of the at least one battery. The battery measurement circuit determines state of charge (SOC) and/or state of health (SOH) characteristics of the at least one battery in response the measured open circuit voltage and/or open circuit voltage behavior of the at least one battery.

The battery management circuit includes a logic gate having a first input coupled to the second terminal of the current sensing circuit, a second input coupled to the first terminal of the battery measurement circuit, and an output coupled to the control terminal of the switching circuit. The logic gate is configured to receive the current sensing signal from the current sensing circuit and the battery measurement signal from the battery measurement circuit at the first and second inputs thereof. In response thereto, the logic gate provides a logic gate output signal at the output thereof. The logic gate output signal controls current flow through the current conducting terminals of the switching circuit.

The battery management circuit includes a switch control circuit having an input coupled to the second terminal of the current sensing circuit and an output. The switch control circuit is configured to receive the current sensing signal at the input thereof and in response thereto produce a switched output signal at the output thereof. The battery management circuit includes a logic gate having a first input coupled to the output of the switch control circuit, a second input coupled to the first terminal of the battery measurement circuit, and an output coupled to the control terminal of the switching circuit. The logic gate is configured to receive the switched output signal and the battery measurement signal at the first and second inputs thereof. In response thereto, the logic gate provides a logic gate output signal at the output thereof. The logic gate output signal controls current flow through the current conducting terminals of said switching circuit.

In one embodiment, the switching circuit includes a field-effect transistor (FET) having a source terminal, a drain terminal and a gate terminal. The source terminal corresponds to the first terminal of said switching circuit, the drain terminal corresponds to the second terminal of said switching circuit, and the gate terminal corresponds to the third terminal of said switching circuit so as to provide a configuration which supports negative voltage system configurations.

It should be appreciated that the drain and source terminals must be reversed for positive voltage systems (i.e. the drain terminal corresponds to the first terminal of the switching circuit, the source terminal corresponds to the second terminal of the switching circuit).

It should also be appreciated that the switching circuit can be placed in either a negative or positive power path of the battery management circuit.

The battery management circuit may also include one or more of the following features individually or in combination with other features. The FET of the switching circuit may be provided as a metal-oxide-semiconductor field-effect transistor (MOSFET). The MOSFET may be provided as an enhancement mode MOSFET. The switching circuit may include at least one diode having a positive terminal and a negative terminal. The positive terminal may be coupled to the first terminal of the switching circuit, and the negative terminal may be coupled to the second terminal of the switching circuit. The at least one diode may be provided as a p-n junction diode. The at least one diode may be provided as a parasitic diode integrated into the MOSFET of the switching circuit, a discrete diode or a combination thereof. The battery measurement circuit may be provided as part of a controller. The controller may be configured to provide the battery measurement signal.

In another aspect of the concepts described herein, a circuit includes a power supply having first and second opposing terminals. The power supply is configured to generate a supply voltage. The circuit also includes an electrical load having a first terminal coupled to the first terminal of the power supply and a second opposing terminal coupled to the second terminal of the power supply. The electrical load is configured to receive the supply voltage from the power supply. The circuit also includes a switching circuit having a first terminal coupled to the first terminal of the electrical load, a second terminal, and a third, control terminal. The first and second terminals provide current conducting terminals of the switching circuit.

The switching circuit includes a plurality of metal-oxide-semiconductor field-effect transistors (MOSFETs). Each of the MOSFETs are provided having a first, source terminal, a second, drain terminal, and a third, gate terminal. The source terminals of the MOSFETs are coupled to the first terminal of the switching circuit, the drain terminals of the MOSFETs are coupled to the second terminal of the switching circuit, and the gate terminals of the MOSFETs are coupled to the control terminal of the switching circuit. The switching circuit also includes a corresponding plurality of diodes. Each of the diodes has a positive terminal and a negative terminal. The positive terminals of the diodes are coupled to the source terminals of the MOSFETs and the negative terminals of the diodes are coupled to the drain terminals of the MOSFETs.

The circuit additionally includes a current sensing circuit having a first terminal coupled to the second terminal of the switching circuit, a second terminal coupled to the control terminal of the switching circuit, and a third terminal. The current sensing circuit is configured to receive a current signal from the second terminal of the switching circuit at the first terminal thereof, measure a direction of the current signal, and provide a current sensing signal corresponding to the direction of the current signal in response thereto at the second terminal of the current sensing circuit.

The circuit further includes at least one battery having a first terminal coupled to the third terminal of the current sensing circuit and a second opposing terminal coupled to the second terminal of the electrical load. The circuit also includes a battery measurement circuit having a first terminal coupled to the control terminal of the switching circuit and at least a second terminal coupled to the first and second terminals of the at least one battery. The battery measurement circuit is configured to measure one or more characteristics of the at least one battery and provide a battery measurement signal in response thereto at the first terminal of the battery measurement circuit. A control signal corresponding to the current sensing signal and the battery measurement signal controls current flow through the current conducting terminals of the switching circuit.

The circuit may include one or more of the following features individually or in combination with other features. In response to measuring the direction of the current signal, the current sensing circuit may further provide a corresponding current sense control signal to a third terminal of the battery measurement circuit to control measurement of the one or more characteristics of the at least one battery. The current sense control signal may also control measurement of current flow rate, and charge into and out of the at least one battery by the battery measurement circuit. The plurality of MOSFETs in the switching circuit may be five MOSFETs.

The circuit may further include a logic gate having a first input coupled to the second terminal of the current sensing circuit, a second input coupled to the first terminal of the battery measurement circuit, and an output coupled to the control terminal of the switching circuit. The logic gate may be configured to receive the current sensing signal from the second terminal of the current sensing circuit and the battery measurement signal from the battery measurement circuit at the first and second terminals thereof. In response thereto, the logic gate may provide a logic gate output signal at the output thereof. The circuit may further include an opto-isolator circuit having an input coupled to the logic gate output and an output coupled to the control terminal of the switching circuit. The opto-isolator circuit may be configured to receive the logic gate output signal at the input thereof and in response thereto provide an opto-isolator circuit output signal at an output thereof. The opto-isolator circuit output signal may control current flow through the current conducting terminals of the switching circuit.

The battery measurement circuit may further include a current source, a ballast resistor. The current source and the ballast resistor may be used by the battery measurement circuit to measure an internal (or characteristic) resistance of the at least one battery. The current sensing circuit may be further configured to measure magnitude and polarity of the current signal received from the switching circuit. The current sensing signal provided by the current sensing circuit may be further indicative of the magnitude and the plurality of the current signal. The switching circuit, the current sensing circuit, and the battery measurement circuit may be provided as part of a battery management circuit for managing the at least one battery. Each of the MOSFETs in the switching circuit may be provided as enhancement mode MOSFETs.

With the above arrangements, circuits and techniques suitable for battery management (e.g., charge control and measurement) are provided.

BRIEF DESCRIPTION OF THE DRAWINGS

The foregoing and other objects, features and advantages of the concepts, systems and techniques described herein will be apparent from the following description of particular embodiments, as illustrated in the accompanying drawings in which like reference characters refer to the same elements throughout the different views. The drawings are not necessarily to scale, emphasis instead being placed upon illustrating the principles of the concepts, systems, circuits and techniques for which protection is sought.

DETAILED DESCRIPTION

Figure 1:
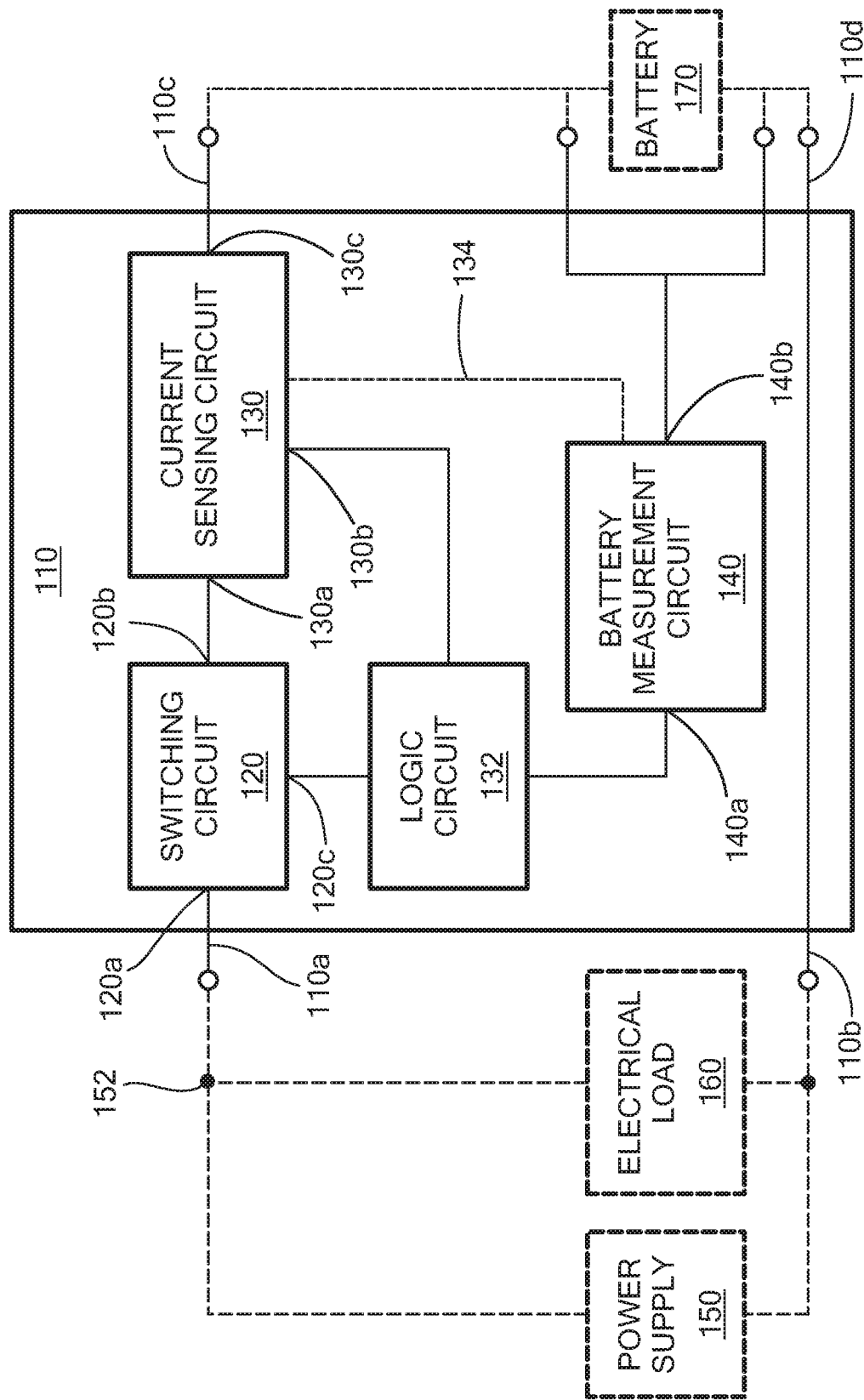
FIG. 1 is block diagram of an example circuit including a battery management circuit.

It will be understood that any specific embodiments described herein are shown by way of illustration and not as limitations of the disclosure and the concepts described herein. Features of the subject matter described herein can be employed in various embodiments without departing from the scope of the concepts sought to be protected.

Definitions

For convenience, certain introductory concepts and terms used in the specification are collected here.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied, for example, in a specially programmed microprocessor, a digital signal processor (DSP), or an application specific integrated circuit (ASIC), which can be an analog ASIC or a digital ASIC. Additionally, in some embodiments the "processor" can be embodied in configurable hardware such as field programmable gate arrays (FPGAs), programmable logic arrays (PLAs) or programmable logic controllers (PLCs). In some embodiments, the "processor" can also be embodied in a microprocessor with associated program memory. Furthermore, in some embodiments the "processor" can be embodied in a discrete electronic circuit, which can be an analog circuit or digital circuit.

While battery packs and battery strings including a select number of batteries are described in several examples below, the select number of batteries are discussed to promote simplicity, clarity and understanding in the drawings as well as in the written description of the broad concepts, systems, circuits and techniques sought to be protected herein and is not intended to be, and should not be construed, as limiting. The concepts, systems, circuits and techniques disclosed herein may, of course, be implemented using more than or less than the select number of batteries. Further, it should be appreciated that the battery packs, battery strings and batteries (e.g., single or multi-cell batteries) described in the examples below may be provided as part of a "larger" system (e.g., a battery bank including a plurality of battery strings, or a monoblock battery including a plurality of battery cells) in some embodiments.

Referring now to FIG. 1, an example circuit in accordance with the concepts, systems, circuits and techniques sought to be protected herein is shown. The circuit includes a battery management circuit 110 coupled between a first portion of the circuit including a power supply 150 and an electrical load 160, and second portion of the circuit including a battery pack 170. The power supply 150 (e.g., a direct-current (DC) power supply) generates a supply voltage for use by the electrical load 160. In the event the power supply 150 fails to provide the necessary supply voltage to the electrical load 160 at power bus 152 (e.g., during a power failure), the battery pack 170, which includes at least one battery (e.g., a single or multi-cell battery), supplies some or all of the necessary supply voltage to the electrical load 160.

The battery management circuit 110 includes a switching circuit 120 serially coupled between a terminal (e.g., a first terminal) of the power supply 150 and a terminal (e.g., a first terminal) of the battery pack 170. A first terminal 120a of switching circuit 120 is coupled to a first terminal 110a of the battery management circuit 110 in the illustrated embodiment. Additionally, a second terminal 120b of switching circuit 120 is coupled to a third terminal 110c of battery management circuit 110 through a current sensing circuit 130 in the illustrated embodiment. In particular, a first terminal 130a of current sensing circuit 130 is coupled to the second terminal 120b of the switching circuit 120 and a third terminal 130c of current sensing circuit 130 is coupled to the third terminal 110c of the battery management circuit 110. Thus, the switching circuit 120 and the current sensing circuit 130 are serially coupled in a circuit path between the first and third terminals 110a, 110c of the battery management circuit 110.

It should be appreciated that current sensing in the circuit is performed in series with the circuit path between the first and third terminals 110a, 110c of the battery management circuit 110. A desirable technique to measure full current through switching circuit 120 is to place current sensing circuit 130 in series with that current. It should, of course, be appreciated that although current sensing circuit 130 is shown as disposed proximate to second terminal 120b of switching circuit 120 (i.e., on the right side of switching circuit 130) in the illustrated embodiment, current sensing circuit 130 can also be disposed proximate to first terminal 120a of switching circuit 130 (i.e., on the left side of switching circuit 120). Current sensing circuit 130 may comprise one or more of several different types of measuring circuits, which will all need to measure total current (i.e., total current of a current signal) passing through switching circuit 120. It should also be appreciated that current sensing circuit 130 may be used to measure magnitude and polarity of the current signal, as well as measure a direction of the current signal.

A second terminal 130b of current sensing circuit 130 is coupled to a third (or control) terminal 120c of the switching circuit 120 through a logic circuit 132. A first terminal 140a of a battery measurement circuit 140 is also coupled to the switching circuit 120 through logic circuit 132. As will become apparent from the description herein below, the logic circuit 132 may receive signals from the current sensing circuit 130 and the battery measurement circuit 140. In response to such signals, logic circuit 132 may provide a control signal (e.g., a logic gate output signal) to control terminal 120c of the switching circuit 120. It should be appreciated that logic circuit 132 (or the function performed by logic circuit 132) may be implemented as part of any or all of the current sensing circuit 130, the switching circuit 120 and/or the battery measurement circuit 140. Alternatively, portions of logic circuit 132 (or the function performed by logic circuit 132) may be distributed among any or all of the current sensing circuit 130, the switching circuit 120 and/or the battery measurement circuit 140. The battery measurement circuit 140 is, in turn, coupled across the battery pack 170 (e.g., through at least a second terminal 140b).

First and second terminals of the switching circuit 120 correspond to current conducting terminals of the switching circuit 120 in the illustrated embodiment (i.e., in a first state, the switching circuit 120 provides a low impedance signal path between the two current conducting terminals of the switching circuit 120 and in a second state, the switching circuit 120 provides a high impedance signal path between the two current conducting terminals of the switching circuit 120). The switching circuit 120 may, for example, be provided from one or more switching elements such as electro-mechanical relays and/or transistors. Additionally, the transistors may be provided as metal oxide semiconductor field effect transistors (MOSFET). Example switching circuits, including those comprising transistors, are described in conjunction with the figures below.

The current sensing circuit 130 receives a current signal from switching circuit 120 that may, for example, be generated during charging or discharging of the battery pack 170. In response thereto, current sensing circuit 130 measures a direction (e.g., charging or discharging direction) of the current signal and produces a current sensing signal corresponding to the direction of the current signal at second terminal 130b of current sensing circuit 130. Current sensing circuit 130 may also provide a corresponding current sense control signal to battery measurement circuit 140, as indicated by the signal path designated by reference numeral 134 in FIG. 1. The current sense control signal may, for example, control measurement of one or more characteristics of the at least one battery, and/or control measurement of current flow rate, and/or charge into and out of the at least one battery in battery pack 170, as will be discussed.

In response to receiving the current sensing signal from the current sensing circuit 130 (or a corresponding signal from either the logic circuit 132, or the battery measurement circuit 140), the switching circuit 120 is placed in either one of two switch states. In a first one of the switch states (i.e., a first switch state), the switching circuit 120 provides a low impedance signal path between the battery pack 170 and the load 160. In a second one of the switch states (i.e., a second switch state), the switching circuit 120 provides a high impedance signal path between the battery pack 170 and the load 160, and the power supply 150. Thus, in the second switch state, the battery pack 170 is electrically de-coupled from the power supply 150.

As noted above, battery pack 170 includes at least one battery. In the illustrated embodiment, battery pack 170 is not properly a part of the battery management circuit 110 and is thus shown separate from the battery management circuit 110 in the example embodiment shown. Battery pack 170 may, for example, include one or more lead acid (LA) or valve regulated lead acid (VRLA) rechargeable batteries or cells, arranged in series or in parallel. Additionally, in one embodiment, battery pack 170 may be provided as a battery bank which includes a plurality of strings with each of the battery strings including a plurality of batteries. Further arrangements and configurations of the battery pack 170 are of course possible.

The battery measurement circuit 140 is configured to measure one or more characteristics of battery pack 170 (e.g., state of charge (SOC) and/or state of health (SOH) characteristics of battery pack 170, or of individual batteries in the battery pack 170). In response thereto, the battery measurement circuit 140 produces a battery measurement signal at the first terminal 140a of the battery measurement circuit 140. The battery measurement signal is coupled to the logic circuit 132. In response to receiving the current sensing signal from the current sensing circuit 130 and/or the battery measurement signal from the battery measurement circuit 140, logic circuit 132 provides a control signal (e.g., a logic gate output signal) to control terminal 120c of switching circuit 120. The control signal places the switching circuit 120 into one of two states (i.e., one of two switch states, as discussed above) and thus controls current flow through the current conducting terminals 120a, 120b of the switching circuit 120. It should be appreciated that both analog and digital control signals are possible.

A digital control signal (or a digital signal approach) would present two possible switch states, ON or OFF. A rapid on/off function (i.e., pulsing), as may be provided by the digital control signal, may, for example, be used by the switching circuit 120 to perform certain functions (e.g., such as battery balancing and sulfation removal). Additionally, in some embodiments, both pulse frequency and duty cycle of the digital control signal may be controlled for controlling the switch state of the switching circuit 120.

An analog control signal (or an analog signal approach) would be utilized, for example, if one wanted to turn the switching circuit 120, or switching functionality of the switching circuit 120, partially on (e.g. to limit current). Additionally, an analog control signal would be utilized, for example, if one wanted to provide a control signal which has a signal shape other than a full amplitude, on/off type of pulse.

In one embodiment, current sensing circuit 130 includes at least one current-carrying conductor (e.g., a wire, a coil, or any other conductor that can produce a magnetic field when a current runs through the conductor) (not shown) and at least one transducer (e.g., a fluxgate transducer or a Hall effect transducer) (not shown) for measuring current flowing through the current-carrying conductor (and the switching circuit 120). The at least one current-carrying conductor can have a first terminal coupled to second terminal 120b of switching circuit 120, and a second opposing terminal coupled to third terminal 110c of battery management circuit 110. Current flowing through the at least one current-carrying conductor will produce a magnetic field which, in turn, can be detected by the at least one transducer and used to determine the current (e.g., magnitude, direction, polarity, and/or changes in the current). The at least one transducer may be positioned adjacent to the at least one current-carrying conductor, on top of the at least one current-carrying conductor, or beneath the at least one current-carrying conductor as a few examples.

The current sensing circuit 130 can additionally include a resistor (not shown) which is placed in series with the at least one current-carrying conductor. A voltage drop across the resistor can be measured (e.g., using a digital volt meter (DVM) or an equivalent thereof) to determine the current flowing through the current-carrying conductor (and the switching circuit 120). Other systems and methods of determining the current are also possible.

Further aspects of the concepts, systems, circuits and techniques sought to be protected herein, with particular emphasis on operation of circuitry of battery management circuits (e.g., 110, shown in FIG. 1), are described in conjunction with the figures below.

Figure 1A:
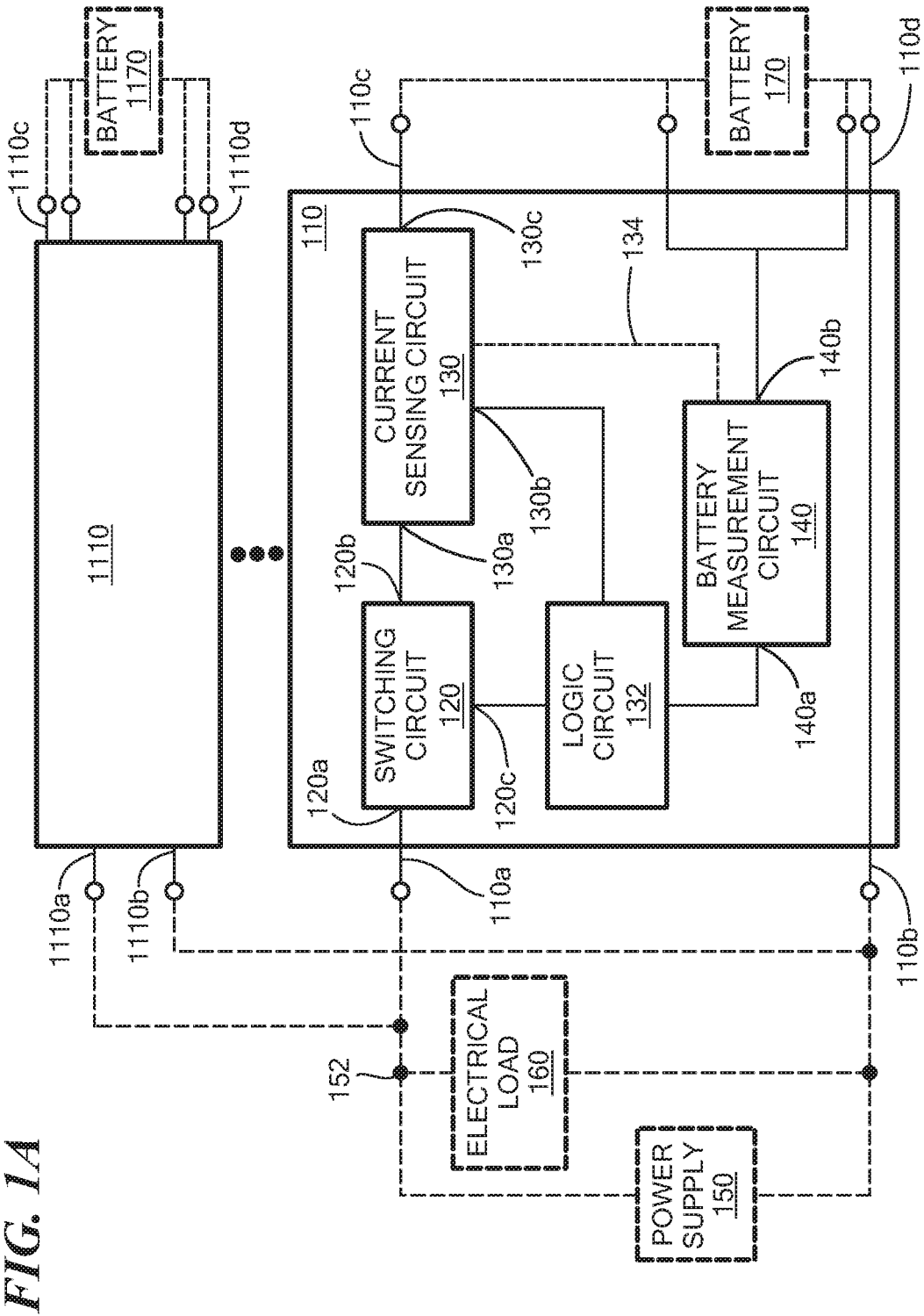
FIG. 1A is block diagram of an example circuit including a plurality of battery management circuits.

Referring now to FIG. 1A, another example circuit is shown. The circuit includes power supply 150 and electrical load 160. The circuit also includes N number of battery packs (here, battery packs 170, 1170) and N corresponding battery management circuits (here, battery management circuits 110, 1110) in the illustrated embodiment. In some embodiments, however, a greater number of battery management circuits may exist than battery packs, and vice versa (e.g., a circuit including five battery packs may have four battery management circuits).

Battery management circuit 1110, which may be the same as or similar to battery management circuit 110, has a first terminal 1110a configured to be coupled to the first terminal of power supply 150 and to the first terminal of electrical load 160. Battery management circuit 1110 also has a second terminal 1110b configured to be coupled to the second terminal of power supply 150 and to the second terminal of electrical load 160. Battery management circuit 1110 additionally has third and fourth terminals 1110c, 1110d configured to be coupled to first and second opposing terminals of battery pack 1170, which may be the same as or similar to battery pack 170.

Similar to the circuit shown in FIG. 1, the power supply 150 generates a supply voltage for use by the electrical load 160. Here, however, in the event the power supply 150 fails to provide the necessary supply voltage to the electrical load 160 (e.g., during a power failure), battery pack 170, battery pack 1170 and/or one or more other battery packs in the circuit (not shown) may collectively or selectively supply some or all of the necessary supply voltage to the electrical load 160. In one embodiment, for example, during a power failure select ones of the battery packs (e.g., 170, 1170) in the circuit (e.g., as may be determined by the battery management circuits) supply the supply voltage to the electrical load 160.

As noted above in conjunction with FIG. 1, current sensing circuit 130 of battery management circuit 110 may be used to measure direction, magnitude and polarity of the current signal passing through switching circuit 120 of battery management circuit 110. In one embodiment, similar techniques apply to the other battery management circuits (e.g., 1110) in the circuit of FIG. 1A.

In particular, the direction of the current signals measured by each of the battery management circuits (e.g., 110, 1110) may indicate if the battery packs (e.g., 170, 1170) coupled to the battery management circuits are being charged or discharged. When the polarity of the current signals are in a battery charge direction (i.e., of a positive polarity), the battery measurement circuit (e.g., 140) of a corresponding battery management circuit has control of the switching circuit (e.g., 120) of the battery management circuit. In contrast, when the polarity of the current signals are in a battery discharge direction (i.e., of a negative polarity), hardware circuits (e.g., current sensing circuit 130) of a corresponding battery management circuit overrides battery measurement circuit operation of the switching circuit and turns it on, to provide efficient power delivery from the battery packs to the power bus 152 (e.g., a DC power bus) of the circuit.

The magnitude of the discharge of the battery packs (as determined by measuring the current signals) may be used to determine how much remaining run-time the electrical load 360 has through use of the battery packs in the circuit. Additionally, the magnitude of the charge of the battery packs (as determined by measuring the current signal) may be used to determine how much the battery packs need to be charged and how much time it will take to charge the battery packs, as a few examples. Measuring the current and voltage of the battery packs (or select ones of the battery packs) over time (e.g., during charging or discharging) will allow for calculation of charge of the battery packs and power removed from the battery packs.

In a circuit or system including a plurality of battery management circuits, as shown in FIG. 1A, for example, the battery management circuits (e.g., 110, 1110) are provided capable of communicating with each other (e.g., through use of one or more processors in the battery management circuits, as will be discussed). The battery management circuits may, for example, communicate with each other to coordinate charging of the battery packs (or individual batteries in the battery packs) to limit excessive battery charge current, which may prevent power supplies (e.g., 150) of the circuit or system from powering electrical loads (e.g., 160) of the circuit or system.

For instance, in a cell site where power (e.g., alternating current (AC) power) has been down for days and then returns, the battery packs (e.g., 170, 1170) of the circuit or system may be severely discharged and may draw very large charging currents during a charging operation when the power returns. If all the battery packs were placed on a power bus (e.g., 152) of the circuit or system during the charging operation, for example, they could place the power supply (or power supplies) of the cell site into a current limit mode. This may, for example, prevent the cell site from becoming operational until the battery packs acquire enough charge to allow the power bus to increase to a point where electrical equipment (e.g., 160) of the cell site will operate. In one aspect of the concepts, systems, circuits and techniques sought to be protected herein, through use of a plurality of battery management circuits described herein in the cell site, the battery management circuits are able to coordinate to allow the cell site to operate substantially immediately after power has returned to the power supply (or power supplies) and then charge the battery packs as quickly as possible, without disrupting operation of the electrical equipment.

Figure 2:
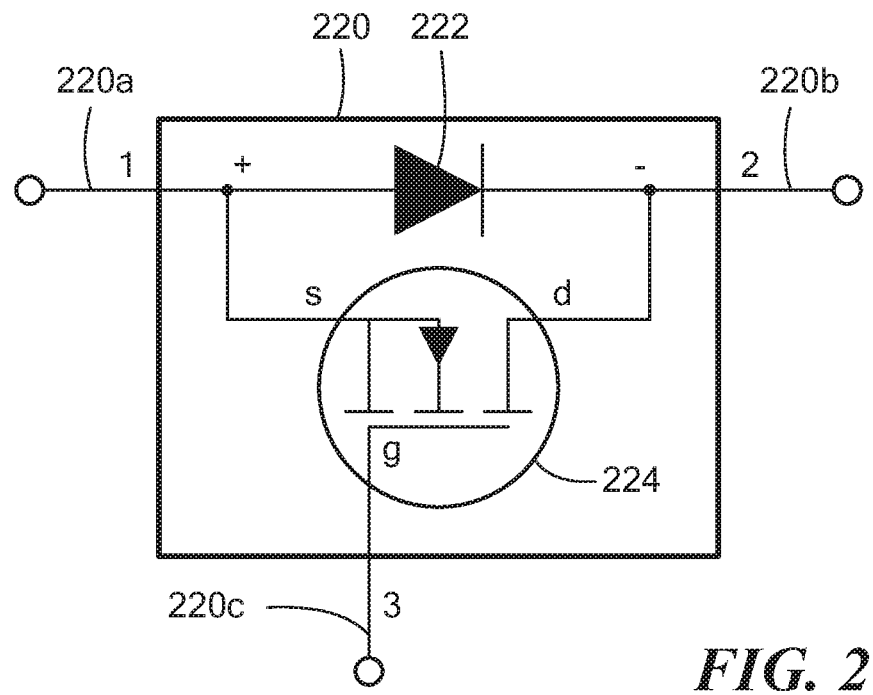
FIG. 2 is a block diagram of an example configuration of a switching circuit suitable for use with the circuits of FIGS. 1 and 1A, for example.

Referring now to FIG. 2, an example switching circuit 220, which may be the same as or similar to the switching circuit 120 of FIG. 1 and suitable for use in the circuit of FIG. 1, is provided having a first terminal 220a, a second terminal 220b, and a third terminal 220c. First and second terminals 220a, 220b correspond to current conducting terminals of the switching circuit 220, and third terminal 220c corresponds to a control terminal of the switching circuit 220. The switching circuit 220 includes at least one diode and at least one FET, as represented by diode 222 and FET 224, respectively, in the example embodiment shown. Although the switching circuit 220 may be implemented using a plurality of diodes and/or a plurality of FETs, a single diode 222 and a single FET 224 are shown to promote simplicity, clarity and understanding in the description of the concepts, systems, circuits and techniques sought to be protected herein and is not intended to be, and should not be construed, as limiting. The switching circuit 220 may, of course, comprise more than a single diode 222 and a single FET 224 arranged in series or in parallel depending upon the needs of a particular application.

The diode 222, which may be a parasitic diode of the FET 224, a discrete diode (e.g., a discrete p-n junction diode), or a combination thereof, for example, has a positive terminal (+) and a negative terminal (−). As is known, some FETs (e.g., silicon MOSFETs, silicon carbide MOSFETs) typically contain a parasitic (or "body") diode that may, for example, be integrated into a substrate of the FET. Such FETs may be found suitable in the example embodiment shown. The positive terminal of the diode 222 is adapted to be coupled to first terminal 220a of switching circuit 220. Additionally, the negative terminal of the diode 222 is adapted to be coupled to second terminal 220b of switching circuit 220. In one embodiment, when conducting current, the diode 222 provides a low impedance signal path between first and second terminals 220a, 220b (i.e., the current conducting terminals) of switching circuit 220. These terminals may, for example, be coupled between a load (e.g., electrical load 160 of FIG. 1) and a battery pack (e.g., battery pack 170 of FIG. 1).

The FET 224, which is provided as an enhancement mode MOSFET in the example embodiment shown, has a source terminal (s), a drain terminal (d), and a gate terminal (g). The source terminal is adapted to couple to first terminal 220a of switching circuit 220, the drain terminal is adapted to couple to second terminal 220b of switching circuit 220 and the gate terminal is adapted to couple to third 220c terminal of switching circuit 220. In some embodiments, the source, drain and gate terminals of the FET 224 correspond to the first, second, and third terminals 220a, 220b, 220c of the switching circuit 220, respectively.

The FET 224 is coupled to receive a control signal (e.g., a control signal from a logic circuit) at the gate terminal, with current flow through the source terminal and drain terminal of the FET 224 (i.e., current conducting terminals of the FET 224) being controlled by the control signal. As one example, current flows through the source terminal and gate terminal of the FET 224 when the control signal has a potential that is substantially greater than a threshold voltage of the gate terminal, and does not flow when the control signal has a potential that is substantially less than the threshold voltage. Operation and switching characteristics of FETs (e.g., MOSFETs) is conventional in the art and, therefore, is not described in detail herein.

Figure 2A:
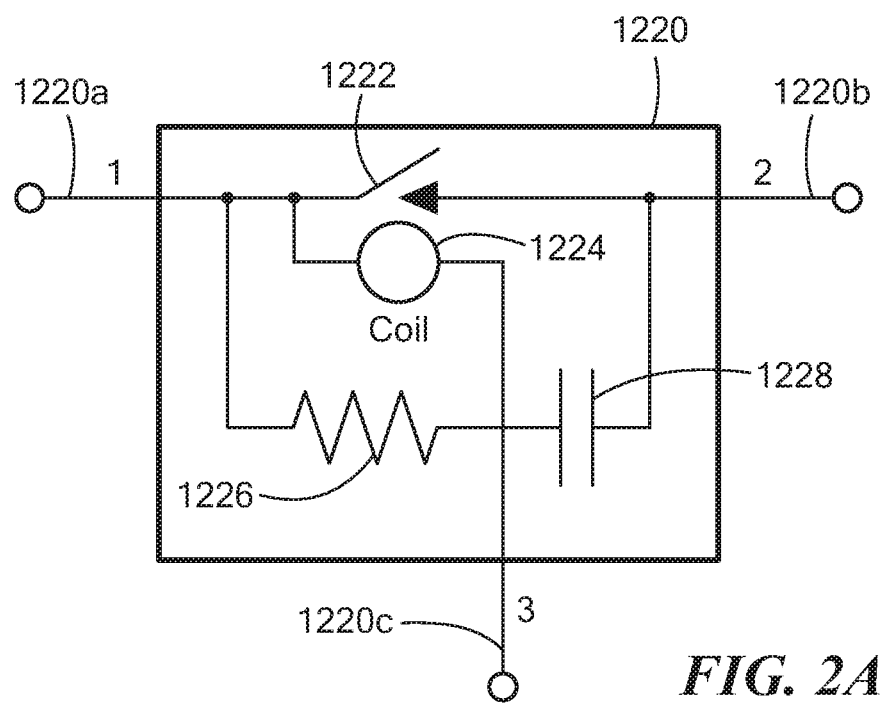
FIG. 2A is a block diagram of another example configuration of a switching circuit suitable for use with the circuit of FIGS. 1 and 1A, for example.

Referring now to FIG. 2A, another example switching circuit 1220, which may be the same as or similar to the switching circuit 120 of FIG. 1 and suitable for use in the circuit of FIG. 1, is provided having a first terminal 1220a, a second terminal 1220b, and a third (or control) terminal 1220c. Similar to the switching circuit 220 of FIG. 2, first and second terminals 1220a, 1220b of switching circuit 1220 correspond to current conducting terminals of the switching circuit 1220.

The switching circuit 1220 includes an electro-mechanical relay 1222 and an "RC snubber" circuit comprising a resistor 1226 and a capacitor 1228 in the illustrated embodiment. The electro-mechanical relay 1222 is driven by a coil 1224 (e.g., a solenoid coil). The coil 1224 has a first terminal adapted to couple to first terminal 1220a of switching circuit 1220, and a second, control terminal adapted to couple to third terminal 1220c of switching circuit 1220. The control terminal may, for example, be coupled to receive a control signal from third terminal 1220c of switching circuit 1220, with the control signal capable of controlling current flow through the coil 1224. Operation of electro-mechanical relays, coils and "RC snubber" circuits is conventional in the art and, therefore, is not described in detail herein. In one embodiment, transient-voltage-suppression (TVS) devices (not shown) and "RC snubber" circuits (e.g., the RC snubber circuit shown in FIG. 2A, for example) may be used to protect the FET 224 of FIG. 2, for example, from damage by external arcing and cable inductance.

Figure 3:
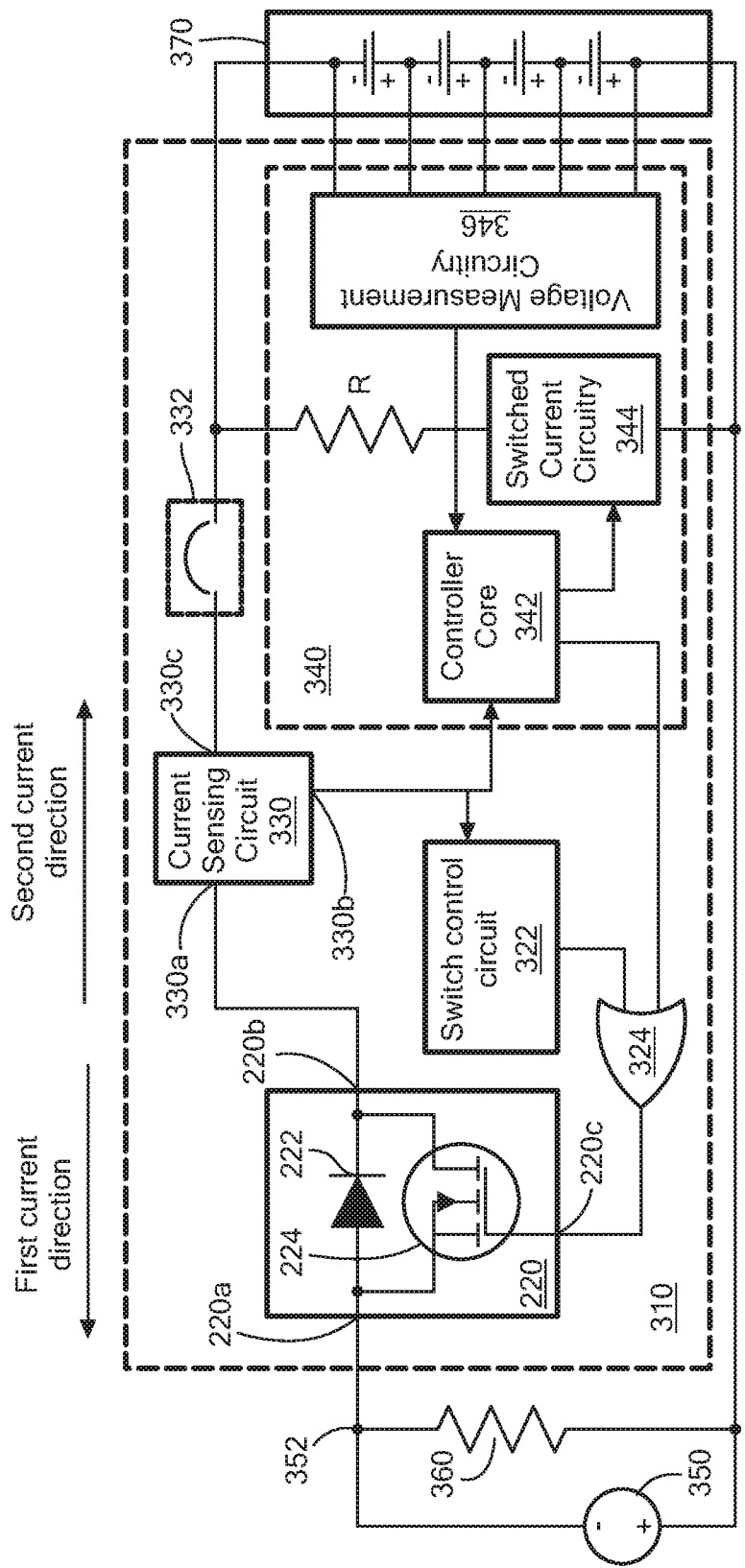
FIG. 3 is a schematic diagram illustrating a circuit topology for an example circuit including a battery management circuit.

Referring now to FIG. 3, a battery management circuit 310, which may be the same as or similar to the battery management circuit 110 described above in conjunction with FIG. 1 and in which like elements of FIG. 2 are shown having like reference designations, is coupled between a power supply 350 and an electrical load 360, and a battery string or battery pack 370. The battery pack 370 includes a plurality of batteries. It should be noted that power supply 350, load 360 and battery pack 370 are not properly a part of battery management circuit 310 in the illustrated embodiment. However, in other embodiments, one or more of the power supply 350, load 360, and battery pack 370 may be provided as part of the battery management circuit 310.

The electrical load 360, which can be the same as or similar to the electrical load 160 of FIG. 1, has a first connecting lead (i.e., a first terminal) coupled to a first terminal (e.g., a negative terminal) of the power supply 350 (e.g., a direct-current (DC) power supply). The load 360 also has a second opposing connecting lead (i.e., a second terminal) coupled to the second terminal (e.g., a positive terminal) of the power supply 350. Thus, load 360 is coupled to receive a supply voltage generated by the power supply 350, which can be the same as or similar to the power supply 150 of FIG. 1.

The battery management system 310 includes a switching circuit 220, a switch control circuit 322, a logic gate 324 (e.g., an "OR" logic gate), a current sensing circuit 330, a circuit breaker 332 (e.g., a 90 amp circuit breaker) and a battery measurement circuit 340 in the example embodiment shown. The switching circuit may be the same as or similar to switching circuit 220 described in conjunction with FIG. 2. Additionally, the circuit breaker 332 is optional in some embodiments and is, thus, shown in phantom. The switching circuit 220 has a first terminal coupled to the first connecting lead of the electrical load 360, a second terminal coupled to a first terminal of the current sensing circuit 330 and a third (or control) terminal coupled to an output of the logic gate 324.

The current sensing circuit 330, which can be the same as or similar to the current sensing circuit 130 of FIG. 1, and switching circuit 220, are serially coupled in a signal path between the power supply 350 and the battery pack 370. In this arrangement, the current sensing circuit 330 and the switching circuit 220 each receive current signals flowing in the signal path. The current sensing circuit 330 measures a direction of the current signals flowing in the signal path (e.g., a first current direction or a second current direction). Additionally, in response to measuring the direction of the current signals, the current sensing circuit 330 produces a current sensing signal representative of the direction of the current signals at a second terminal 330b of the current sensing circuit 330. A first current direction, as illustrated, corresponds to current direction during a battery backup operation (i.e., a discharging direction) while a second current direction corresponds to current direction during a battery charging operation (i.e., a charging direction). In one embodiment, the current sensing signal is provided an analog voltage output (i.e., an analog signal) which represents an amount of current flowing through the signal path. A level (i.e., a voltage level) of the analog signal may indicate direction of the current flowing.

Additionally, in one embodiment, a battery backup operation occurs in one or more stages. A first one of the stages (i.e., stage 1) may be when bus voltage of a power bus (e.g., DC power bus 352) powering the load 360 drops below a voltage of the battery pack 370 and a series diode voltage of diode 222 in switching circuit 220. In response thereto, diode 222 seamlessly conducts current from the battery pack 370 onto the power bus. The action of stage 1 produces a reversal of current, as can be measured by current sensing circuit 330, for example. In a second one of the stages (i.e., stage 2), the reversal of current triggers hardware circuitry (e.g., current sensing circuit 330, switch control circuit 322, and/or logic gate 324) to turn on FET 224 in switching circuit 220. In one embodiment, no software is involved in turning on FET 224 during a battery backup operation.

When the bus voltage of the power bus is within a so-called "normal range," which may correspond to a programmable range threshold in some embodiments, software (e.g., software in controller core 342, as will be discussed) may have control of switch functionality of switching circuit 220 (and FET 224). In one example telecom DC bus with four "healthy" 12V valve regulated lead acid (VRLA) batteries (i.e., four 12V VRLA batteries capable of maintaining a substantially full charge), for example, the programmable threshold may have a minimum value of about 52.5V. The software may also determine when, how and how much to charge battery pack 370 (or individual batteries in the battery pack 370) during a battery charging operation.

In one embodiment in which processor hardware (e.g., controller core 342) in battery management circuit 310 fails or Safety Extra Low Voltage (SELV) power is lost in a system or circuit including the battery management circuit 310, switching circuit 220 may turn on, placing one or more of the batteries in the battery pack 370 in a conventional "float charge" mode, until the system or circuit is otherwise serviced.

The circuit breaker 332 (or electrical switch), which according to some embodiments has an input adapted to couple to second terminal 220b of switching circuit 220, and in the example embodiment shown has an input adapted to couple to a third terminal 330c of the current sensing circuit 330, is coupled to receive a current signal at the input thereof. The current signal may either pass through the circuit breaker 332 to an output thereof or, in response to an overload or short circuit condition, for example, the circuit breaker 332 may prevent current flow to the output thereof. Operation of circuit breakers is conventional in the art and, therefore, is not described in detail herein.

The battery measurement circuit 340, which may be the same as or similar to the battery measurement circuit 140 of FIG. 1, includes a controller core 342, switched current circuitry 344 and voltage measurement circuitry 346 as may be found, for example, in a processor, in the illustrated embodiment. The battery measurement circuit 340 also includes a resistor R which may be provided as a ballast resistor in some embodiments (e.g., to limit amount of current flowing in the battery measurement circuit 340). The switch current circuitry 344, which may include a current source and current measurement circuitry (e.g., an ammeter), is controlled by the controller core 342 (e.g., a current level of current provided by the current source may be controlled by the controller core 342). In one embodiment, the current source (e.g., an internal or built-in current source) is provided as high precision current source (e.g., having an accuracy which is within about one percent or less at about twenty five degrees Celsius (C)). The battery measurement circuit 340 has a first terminal coupled to second terminal 330b of the current sensing circuit 330, at least a second terminal coupled to the battery pack 370 and a third terminal coupled to the second connecting lead of the electrical load 360.

The battery measurement circuit 340 is capable of measuring one or more characteristics of the battery pack 370 (or of each battery in the battery pack 370) through at least the second terminal. In response thereto, the battery measurement circuit 340 provides a battery measurement signal to a first input of the logic circuit 324 (here illustrated as a logic gate 324). The battery measurement signal can, for example, be a two-state signal (i.e., a transistor-transistor logic (TTL) signal having either a logic low value or a logic high value). Application of the battery measurement signal to switching circuit 220 controls current flow through the current conducting terminals (i.e., the first and second terminals) of the switching circuit 220.

The one or more characteristics measured by the battery measurement circuit 310 can include open circuit (OC) voltage and/or OC voltage behavior of the battery pack 370. As one example, the battery measurement circuit 340 can determine state of charge (SOC) and/or state of health (SOH) characteristics of the battery pack 370 (or of individual batteries in the battery pack 370) in response to a measured OC voltage and/or OC voltage behavior of the battery pack 370 (or of individual batteries in the battery pack 370). The battery measurement circuit 340 can also measure a characteristic resistance of the battery pack 370 (or of individual batteries in the battery pack 370). The characteristic resistance of the battery pack 370 may, for example, be used to determine a SOH of the battery pack 370, as will be discussed in conjunction with FIG. 5.

In one embodiment, the switching circuit 220, through the use of device characteristics of FET 224 (e.g., metal oxide semiconductor field effect transistor (MOSFET) device characteristics of FET 224), isolates the battery pack 370 such that the OC behavior of the battery pack 370 can be evaluated by the battery measurement circuit 340, while at a same time maintaining a substantially uninterrupted current flow from the battery pack 370 to the electrical load 360 in the event of a power outage, for example. During a power outage, the power supply 350 may fail to provide power to the electrical load 360.

The switch control circuit 322 (or hardware over-ride circuit), which may perform a toggle switch function or the like, has an input adapted to couple to a second terminal 330b (e.g., an output terminal) of the current sensing circuit 330. The switch control circuit 322 is coupled to receive the current sensing signal from the current sensing circuit 330 at the input thereof. In response to receiving the current sensing signal, switch control circuit 332 generates a switch control signal at an output thereof.

In one embodiment, switch control circuit 322 is provided as a comparator circuit having a programmable threshold which can be set in hardware, software, or both hardware and software, for example. As one example, if a value (e.g., an analog or digital value) of the current sensing signal exceeds a programmed threshold of the switch control circuit 322, then the FET 224 in switching circuit 220 may be turned on (i.e., enabled) through the switch control signal.

The output of switch control circuit 322 is coupled to a second input of logic gate 324. Thus, switch control circuit 322 provides the switch control signal to the second input of the logic gate 324. In one embodiment, a battery measurement signal received from the controller core 342 at the first input of logic gate 324 is to control the charging function (i.e., the charging function when the DC bus voltage is in the normal range). Additionally, in one embodiment, the switch control signal provided from switch control circuit 322 to the second input of logic circuit 324 is a hardware signal to enable the switching circuit 220 for backup operation (hardware override) (e.g., similar to the battery measurement signal produced by the battery measurement circuit 340 in some embodiments). The hardware signal may, for example, correspond to a change in logic state or a change in an analog voltage level.

The logic gate 324 is coupled to receive the battery measurement signal from the battery measurement circuit 340 and the switch control signal from the switch control circuit 322 at first and second inputs, respectively, and produce a logic gate output signal in response thereto at an output thereof. As such, the logic gate output signal can be representative of the battery measurement signal, the switch control signal or a combination thereof. In the example embodiment shown, the logic gate output signal provides the control signal to the control terminal of the switching circuit 220 for controlling current flow through the current conducting terminals (i.e., terminals 220a, 220b) of the switching circuit 220.

In accordance with the concepts, systems, circuits and techniques sought to be protected herein, in the event of a failed battery measurement circuit 340 (e.g., a failure resulting from a failed controller core 342 or a failed internal power supply (not shown) in battery measurement circuit 340), the current sensing circuit 330 will still enable FET 224 of switching circuit 220 (i.e., through the current sensing signal provided to the switch control circuit 322), to maintain efficient back-up power delivery to the electrical load 360 and prevent the diode(s) 222 in the switching circuit 220 from overheating. Such may place the battery pack 370 in a "float condition."

During one example mode of operation (e.g., a so-called "normal" mode of operation), the power supply 350 supplies power to the electrical load 360 and the battery measurement circuit 340 controls current flow through the current conducting terminals (i.e., terminals 220a, 220b) of switching circuit 220. The battery measurement circuit 340 also performs evaluations such as state of charge (SOC) and state of health (SOH) on the battery pack 370 (or on individual batteries in the battery pack 370). If the battery pack 370 needs charging, the battery measurement circuit 340 takes "control" of the switching circuit 220 functions to charge the battery pack 370 (or individual batteries in the battery pack 370).

For example, the battery measurement circuit 340, through evaluation algorithms and various measurements made on the battery pack 370, may determine that the battery pack 370 shows a need for charging. In response thereto, the battery measurement circuit 340 may manipulate the battery charge process of the battery pack 370 by turning the switching circuit 220 on (i.e., providing for current flow through the current conducting terminals of the switching circuit 220) and bringing the battery pack 370 up to charge and into balance.

When the switch circuit 220 is "on," the battery pack 370 receives current from the power supply 350 in a manner that follows the "duty-cycle" of the switching circuit 220, which is defined as the ratio of "on time" to "off time." The duty-cycle can be fixed or varied by software (e.g., software in controller core 342 of battery measurement circuit 340) to influence charge of the battery pack 370.

During a power failure, the power supply 350 output voltage drops until the diode(s) 222 of the switching circuit 220 start to conduct. Diode connection between battery pack 370 and DC power bus 352 engages the battery pack 370 seamlessly until the battery pack 370 is powering the electrical load 360 through the diode(s) 222. When the switch control circuit 322 senses that the current direction of the current signal received from second terminal 220b of switching circuit 220 has shifted to the first direction (i.e. in a battery discharging direction), FET 224 of switching circuit 220 is biased into its conducting (or "ON") state by switch control circuit 322, reducing the voltage drop across the diode(s) 222 to reduce power loss in the circuit.

Under a "normal" operating condition, where the power supply 350 is supplying power for the electrical load 360, the potential of the DC power bus 352 is greater than the potential across resistor R of the battery measurement circuit 340. This condition keeps diode 222 in switching circuit 220 reverse-biased (i.e. biased into their non-conducting or "off" states). With the diode 222 reverse-biased and FET 224 turned off, substantially no current flows into or out of the battery pack 370. This is a so-called "resting" state (i.e. the batteries are in a neutral state, not being charged or discharged), for the battery pack 370. In the resting state, the battery measurement circuit 340 can measure the open-circuit voltage behavior of the battery pack 370 to determine (SOC and SOH) characteristics of the battery pack 370.

Additionally, in accordance with the concepts, systems, circuits and techniques sought to be protected herein, if the power supply 350 was to drop out or fail, there would be substantially no loss of power to the electrical load 360 because diode 222 in switching circuit 220 insures contiguous power transfer. This contiguous power availability is traditionally not possible with fully isolated switches using dual, series MOSFET or other semiconductor switches of electro-mechanical contractors or relays, for example. As discussed above, the diode 222 can be a parasitic diode(s) which is integrated into FET 224, a discrete diode(s), or a combination thereof.

Next described are battery charging methods enabled by the above-described use of the switching circuit 220.

As is known, an industry standard for charging valve regulated lead acid (VRLA), flooded or lead acid (LA)

batteries is to place them on a float charge, which means that they are constantly charged. This charging method accelerates the deterioration of the batteries through dry-out, which is the loss of water in the electrolyte through a process called gassing, and through grid corrosion, which is caused by constantly passing a large float current through the battery.

The battery management circuit 310 described herein above, however, using the switching circuit 220, for example, substantially eliminates gassing and significantly reduces grid corrosion by removing the battery pack 370 from float and placing them in a resting state.

Furthermore, in some embodiments algorithms in the battery measurement circuit 340 (e.g., algorithms in controller core 342) can evaluate the battery pack 370 and determine when to charge the battery pack 370 or cells (i.e., batteries) in the battery pack 370 to keep them optimally charged. The algorithms can also determine when to perform a re-polarization, to further reduce corrosion. The algorithms can additionally adapt and make corresponding adjustments for temperature changes and other parameters (e.g., changes in how well the battery pack 370, or individual batteries in the battery pack 370, hold a charge) to minimize corrosion.

Figure 4:
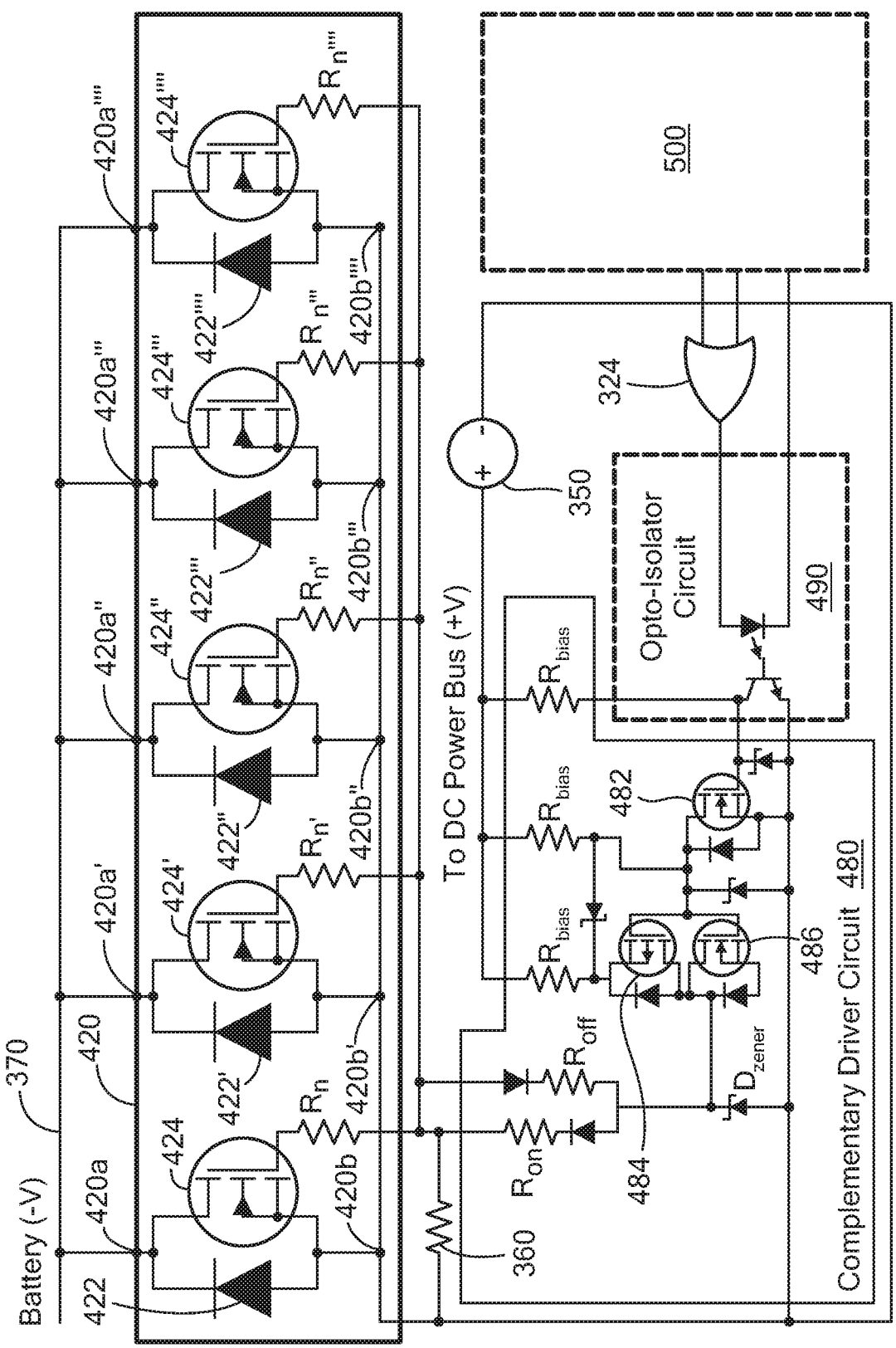
FIG. 4 is a schematic diagram illustrating a circuit topology for another example circuit including a battery management circuit.

Referring now to FIG. 4, in which like elements of FIG. 3 are shown having like reference designations, a circuit similar to the circuit of FIG. 3 is shown. Here, however, the circuit has a switching circuit 420 that comprises a plurality of FETs (e.g., MOSFETs) and associated diodes (whereas the switching circuit 220 of FIG. 3 is illustrated having only a single FET and an associated diode). Moreover, the circuit has additional circuitry (e.g., complementary driver circuit 480 and opto-isolator circuit 490) coupled to the output of the logic gate 324.

In the illustrated embodiment, the switching circuit 420 comprises a plurality of MOSFETs (424, 424', 424", 424''', 424'''') with each MOSFET provided having a corresponding diode (422, 422', 422", 422''', 422'''') and a corresponding pull-down resistor ($R_n$, $R_{n'}$, $R_{n''}$, $R_{n'''}$, $R_{n''''}$) coupled as shown. The pull-down resistors ($R_n$, $R_{n'}$, $R_{n''}$, $R_{n'''}$, $R_{n''''}$), which are the same in some embodiments and substantially different in other embodiments, are each provided having a first terminal adapted to couple to a corresponding gate terminal of the MOSFETs and a second terminal adapted to couple to an output of the complementary driver circuit 480 (and a corresponding terminal of the electrical load 360). In some applications it may be desirable to have at least some or even all of the resistors be provided having different characteristics (e.g. different resistance values, for example, so as to make the MOSFET turn-on and turn-off times different).

Although the switching circuit 420 is shown comprising five MOSFETs arranged in parallel in the illustrated embodiment, the switching circuit 420 can, for example, comprise two MOSFETs, three MOSFETs or more than three MOSFETs arranged in series or in parallel. Number and arrangement of the MOSFETs can be selected based at least in part upon a current carrying requirement of the switching circuit 420 and ability of the MOSFETs to reduce heat that may be generated by the switching circuit 420. In at least some embodiments, heat is primarily generated by the on-resistance characteristic of the MOSFET device.

Power is dissipated in the switching circuit 420 as a function of $I^2R$, where I is the current passing through the MOSFET source-drain path and R is the on-resistance characteristic, specific to that MOSFET type. In one aspect, the MOSFETs of the switching circuit 420 are arranged in parallel to reduce power losses resulting from the switching circuit 420. Paralleling the MOSFETs may, for example, reduce the on-resistance of the MOSFETs similar to paralleling resistors reducing the effective resistance of the resistors. Additionally, internal substrate diodes which may be contained within the MOSFET can have inferior switching and/or voltage characteristics in some embodiments. These conditions can be improved by adding external diodes (e.g., 422) in parallel with the MOSFET internal diode to improve performance.

The complementary driver circuit 480, which is adapted to couple to a corresponding terminal of the electrical load 360, includes an inverted MOSFET p-channel MOSFET 482 and complementary n-channel and p-channel MOSFETs 484 and 486, respectively. It should be appreciated that in some applications, it may be desirable to utilize lower cost/performance driver circuits, comprised of a single driver transistor, either pull-up or down. However, this would compromise the robust turn-on/off drive of the MOSFET switches and in cases where MOSFET gate capacitance is very high, could cause the MOSFETs to over-stress and fail.

On example low cost driver circuit can be achieved by driving the MOSFETs directly from the single photo-transistor inside the opto-isolator. While this would not be robust it is still an operable driver configuration. The complementary driver circuit 480 is designed to be powered by a DC power bus (e.g., DC power bus 352, FIG. 3), which during a "normal" mode of operation (i.e., a non-battery backup mode of operation) is substantially generated by the power supply 350. In one aspect, operating the switching circuit 420 and the complementary driver circuit 480 from the DC power bus increases the reliability of the circuit of FIG. 4 since the DC power bus by design generally cannot fail from power loss unless the power supply 350 and the batteries 370 have both failed.

The opto-isolator (or optocoupler) circuit 490, which is a galvanically isolated device, has an input adapted to couple to an output of the logic gate 324 and an output adapted to couple to an input of the complementary driver circuit 480. First and second inputs of the logic gate 324 are coupled to circuitry 500 that may include a current sensing circuit (e.g., 330, shown in FIG. 3), a battery measurement circuit (e.g., 340, shown in FIG. 3), a switch control circuit (e.g., 322, shown in FIG. 3), as described above in conjunction with FIG. 3. The opto-isolator circuit 490 is optional in some embodiments and is thus shown in phantom. The opto-isolator circuit 490 is configured to receive the logic gate output signal at the input thereof and in response thereto provide an opto-isolator circuit output signal at an output thereof. The opto-isolator circuit output signal may, for example, control current flow through the current conducting terminals of the switching circuit 420 (here, first terminals 420a, 420a', 420a", 420a''', 420a'''', and second terminals 420b, 420b', 420b", 420b''', 420b'''').

When the opto-isolator circuit 490 is active (i.e., LED in the opto-isolator circuit 490 is on), the inverter MOSFET 482 of the complementary driver circuit 480 is off (or not conducting current). In contrast, when the opto-isolator circuit 490 is inactive (i.e., LED in the opto-isolator circuit 490 is off), the opto-isolator circuit 490 stops conducting current, allowing the gate voltage of the inverter MOSFET 482 to rise and turn on the inverter MOSFET 482. Operation of opto-isolator circuit circuits is conventional in the art and, therefore, is not described in further detail herein.

When the inverter MOSFET 482 turns on, the gate terminals of both complementary MOSFETs 484, 486 of the complementary driver circuit 480 are pulled to the DC Power Bus (−V) potential, but voltage-limited by Zener diodes. In the example embodiment shown, the gate-tosource voltage of the MOSFET 486 is limited to a safe operating voltage by a Zener diode placed between the gate and source terminals of the MOSFET 486. This action allows the MOSFET 486 to turn on, and the complementary, MOSFET 484 to turn off. A result is that current flows through the MOSFET 486 into the gate terminals of the MOSFETs (424, 424', 424", 424''', 424'''') of the switching circuit 420. Such may, for example, turn the MOSFETs (424, 424', 424", 424''', 424'''') on, allowing current to flow into the battery string 370 when the DC power bus is supplied power by the power supply 350. In a battery back-up mode, the MOSFETs (424, 424', 424", 424''', 424'''') are enabled by a current-sense function of a current sensing circuit (e.g., 330, shown in FIG. 3), which detects the direction of current flow in the direction of the DC power Bus.

In the switching circuit 420, each MOSFET (424, 424', 424", 424''', 424'''') may have a slightly different threshold voltage, particular where the MOSFET (424, 424', 424", 424''', 424'''') will start to turn on. Such will cause the MOSFET (424, 424', 424", 424''', 424'''') with the lowest threshold voltage to conduct current before any other parallel MOSFETs. If the MOSFETs (424, 424', 424", 424''', 424'''') are not properly rated or otherwise externally current-limited, the MOSFETs (424, 424', 424", 424''', 424'''') can be damaged. To eliminate this potential failure mode, each MOSFET (424, 424', 424", 424''', 424'''') may, for example, specified to individually handle the maximum design current for the power switch function (e.g., of the switching circuit 420). Such eliminates the efficiency losses associated with utilizing relatively high-speed current-balancing techniques, with source resistors or any type of high-bandwidth, isolated current sense devices.

Fail Safe Conditions:

The following example conditions are enabled by the switching circuit 420 being substantially (or entirely) powered by the DC power bus and by utilizing the opto-isolator circuit 490 to maintain the switching circuit 420 in an "active-off" state (i.e. when the opto-isolator's internal LED is "on or active" the MOSFET switch is held in the off state) and provide the required galvanic isolation. For safety requirements, a safety-qualified isolation device may be employed to isolate hazardous voltages produced by the circuit from SELV circuits (not shown) that people may touch.

Fail-Safe Case 1:

The battery measurement circuit (e.g., 340, shown in FIG. 3) controls measurement taking and controls the switching circuit 420 for charging, but only when the power supply 350 is operating. In the event of a power failure by the power supply 370 or a power failure within the battery measurement circuit (i.e., in a backup mode), the battery measurement circuit is over-ridden by the sensing of current reversal (e.g., by the current sensing circuit 330, shown in FIG. 3), and hardware only activation of the switching circuit. Thus, in backup mode, the current sensing circuit will still enable the switching circuit 420 to maintain efficient back-up power delivery and prevent the diodes (422, 422', 422", 422''', 422'''') in the switching circuit 420 from overheating.

Fail-Safe Case 2:

In the event of a power failure within the battery management circuit (e.g., 310, shown in FIG. 3), the opto-isolator circuit 490 will turn-off (e.g., since the LED emitter power of the opto-isolator circuit 490 is supplied by SELV circuits). When the opto-isolator circuit 490 turns off, the switching circuit 420 turns on, placing the battery pack 370 (or individual batteries in the battery pack 370) in a float-charging condition where one or more of the batteries in the battery pack 370 are being float-charged by the DC power bus and are also available for backup service to the load 360.

Figure 5:
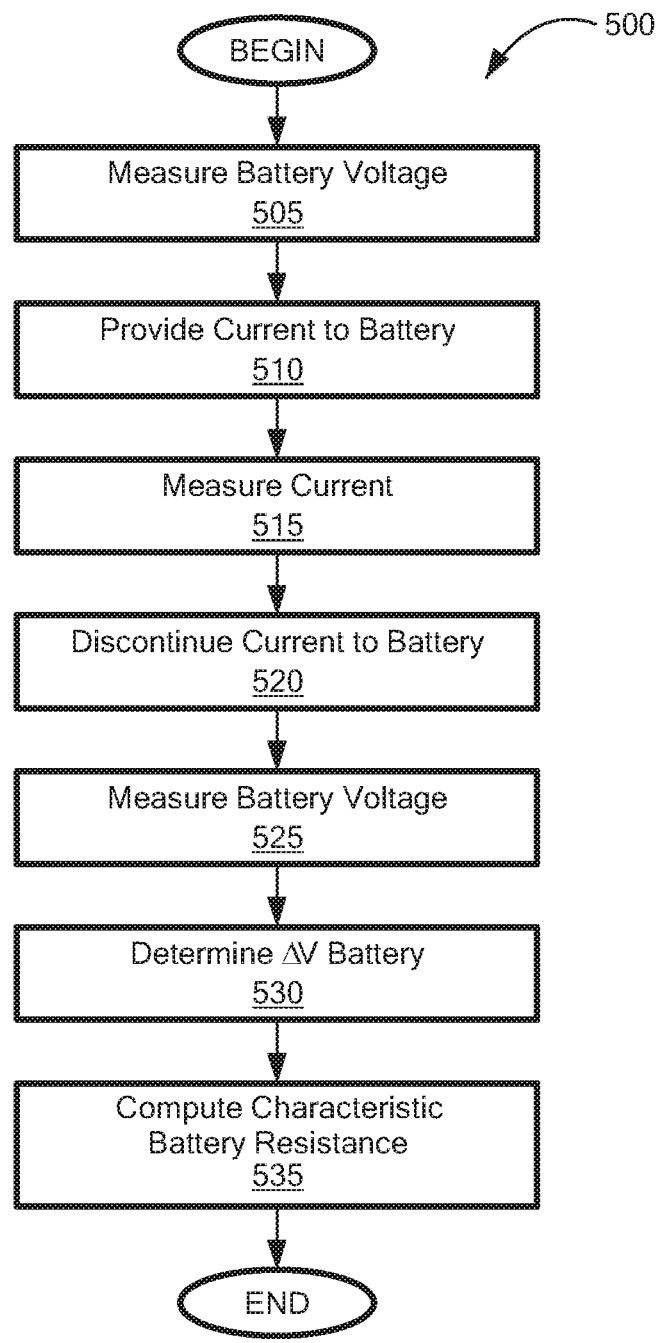
FIG. 5 is a flowchart illustrating an example method for measuring a characteristic resistance of a battery that may be implemented in the circuits of FIGS. 1, 1A, 3 and 4, for example.

Referring also to FIG. 5, a flowchart illustrates an example method 500 for measuring a characteristic resistance (i.e., an internal resistance) of a battery (e.g., 370, shown in FIG. 1) that can be implemented in a battery measurement circuit (e.g., 340, shown in FIG. 3) of a battery management circuit (e.g., 310, shown in FIG. 3). The result of the characteristic resistance measurement (sometimes referred to as "battery resistance") may be an indication of a state of health (SOH) of the battery.

Rectangular elements (typified by element 505 in FIG. 5), as may be referred to herein as "processing blocks," may represent computer software instructions or groups of instructions. The processing blocks can represent steps performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied. Thus, unless otherwise stated, the blocks described below are unordered; meaning that, when possible, the blocks can be performed in any convenient or desirable order including that sequential blocks can be performed simultaneously and vice versa.

As illustrated in FIG. 5, a method 500 for measuring an characteristic resistance of a battery begins at block 505 where voltage measurement circuitry, which can be the same as or similar to voltage measurement circuitry 346 of FIG. 3, measures a first voltage of a battery (e.g., 370). In one embodiment, the first voltage of the battery is measured directly across the terminals (i.e., first and second terminals) of the battery to minimize voltage losses (i.e., voltage drops) which may occur between the battery and the voltage measurement circuitry (e.g., as may occur through wire resistance). In another embodiment, the first voltage of the battery is not measured directly across the terminals and any voltage losses which may occur between the battery and the voltage measurement circuitry is accounted for through use of a voltage drop constant. The voltage drop constant may, for example, be computed through knowledge of a voltage drop occurring between the battery and the voltage measurement circuitry.

At block 510, a current source, which can be the same as or similar to the current source which may be provided in switched current circuitry 344 of FIG. 3, provides current (i.e., test current) to the battery for a predetermined (i.e., fixed) time period (e.g., ten seconds). In one embodiment, the current is provided to the battery substantially immediately after the voltage measurement circuitry measures the first voltage of a battery. Additionally, in one embodiment, the current is a substantially constant current (e.g., a precise, fixed constant current) having a predetermined current value (e.g., one ampere (1 A). The predetermined current value may, for example, be selected to provide a meaningful drop in voltage across the battery over the predetermined time period. The predetermined current value and/or the predetermined time period may also be empirically selected in some embodiments. A 1 A constant current was, for example, empirically determined to be suitable for a wide range of batteries (e.g., 20 A to 200 A batteries).

At block 515, current measurement circuitry, which can be the same as or similar to the current measurement circuitry which may be provided in switched current circuitry 344 of FIG. 3, measures current I flowing through a circuit formed between a battery measurement circuit (e.g., 340) and the battery. In one embodiment, the circuit includes a precision resistor (e.g., a ballast resistor) which may be the same as or similar to resistor R of FIG. 3, and the current I is measured between the precision resistor and the battery (or between any other two points in the circuit). It should, of course, also be appreciated that current sensing can be accomplished by other means, including Hall Effect sensors and Inductive sensors High accuracy current measurements can be achieved using a closed-loop type of current sensor called a Flux Gate sensor. In one illustrative embodiment, FG technology may be used. In some embodiments, both of these latter techniques, may be used because they both provide galvanic isolation from the hazardous voltages present with long series battery strings.

At block 520, after the predetermined time period, the current source discontinues providing current to the battery and, at block 525 the voltage measurement circuitry measures a second voltage of the battery. In one embodiment, the second voltage of the battery is measured substantially immediately after the current source discontinues providing current to the battery. Additionally, the second voltage of the battery may be measured in a similar manner as the first voltage of the battery (e.g., directly across the terminals of the battery).

At block 530, the battery measurement circuit determines a voltage difference ($\Delta V$) between the first voltage and the second voltage of the battery. At block 535, in response knowing $\Delta V$ and the current I measured by the current measurement circuitry at block 515, the battery measurement circuit computes a characteristic resistance of the battery (i.e., characteristic resistance=$|\Delta V/I|$). In one embodiment, in computing the characteristic resistance of the battery, the battery measurement circuit is able to determine a SOH of the battery (or use the characteristic resistance as one SOH characteristic in determining the SOH of the battery).

Subsequent to computing the characteristic resistance of the battery, the method 500 may end. The method ending may, for example, be indicative of the characteristic resistance of the battery (e.g., a resistance of a chemical reaction occurring in the battery) having been measured. In one embodiment, the method 500 may be repeated continuously, periodically, or in response to a control signal (e.g., a control signal as may be provided by controller core 342 of battery measurement circuit 340 of FIG. 3) depending on system and application requirements. The method 500 may be repeated, for example, to compute the characteristic resistance of the battery again, or to compute the characteristic resistance of other batteries in a circuit including the battery.

In one embodiment, the method 500 is repeated a predetermined number of times per day (e.g., about six times per day, or about every four hours of the day) for a predetermined number of days (e.g., about seven days) to provide sufficient data for analysis of a trend (i.e., a trend line) of the battery's resistance (and SOH) over a time period. The predetermined number of times may be selected to minimize discharge of the battery (e.g., to improve life of the battery, and such that it is easy to replace the charge removed from the battery as a result of method 500). Additionally, the charge removed from the battery as a result of method 500 may be replaced substantially immediately after (or a predetermined time after) the method 500 is complete. It should be appreciated that in some embodiments this is a continuous process and in some cases provides a starting point for charging of the battery (or batteries).

Precision of the method 500 (e.g., when repeated the predetermined number of times per day) may be based upon repeatability of: (1) the current provided by the current source to the battery (or batteries) at the block 510, (2) the predetermined time period for which the current is provided at the block 510, and (3) the time between when the current source discontinues providing the current to the battery at block 525, and when the voltage measurement circuitry measures a second voltage of the battery at block 530. In one embodiment, for optimal precision the current provided by the current source at the block 510 should be substantially the same from measurement to measurement. Additionally, the predetermined time period for which the current is provided should be substantially the same from measurement to measurement. Further, the time between when the current source discontinues providing current to the battery at block 525, and when the voltage measurement circuitry measures a second voltage of the battery at block 530, should be substantially the same from measurement to measurement.

In one aspect of the concepts, systems, circuits and techniques sought to be protected herein, the above-described method 500 provides for a more consistent and accurate measurement of characteristic resistance of a battery in comparison to conventional characteristic resistance measurement techniques (e.g., by providing a stable, consistent test current, to characterize the characteristic resistance of the battery). While the characteristic resistance of the battery is described as being computed in a sequence of processes, the example method 500 is not limited to performing the processes in the sequence described.

Figure 6:
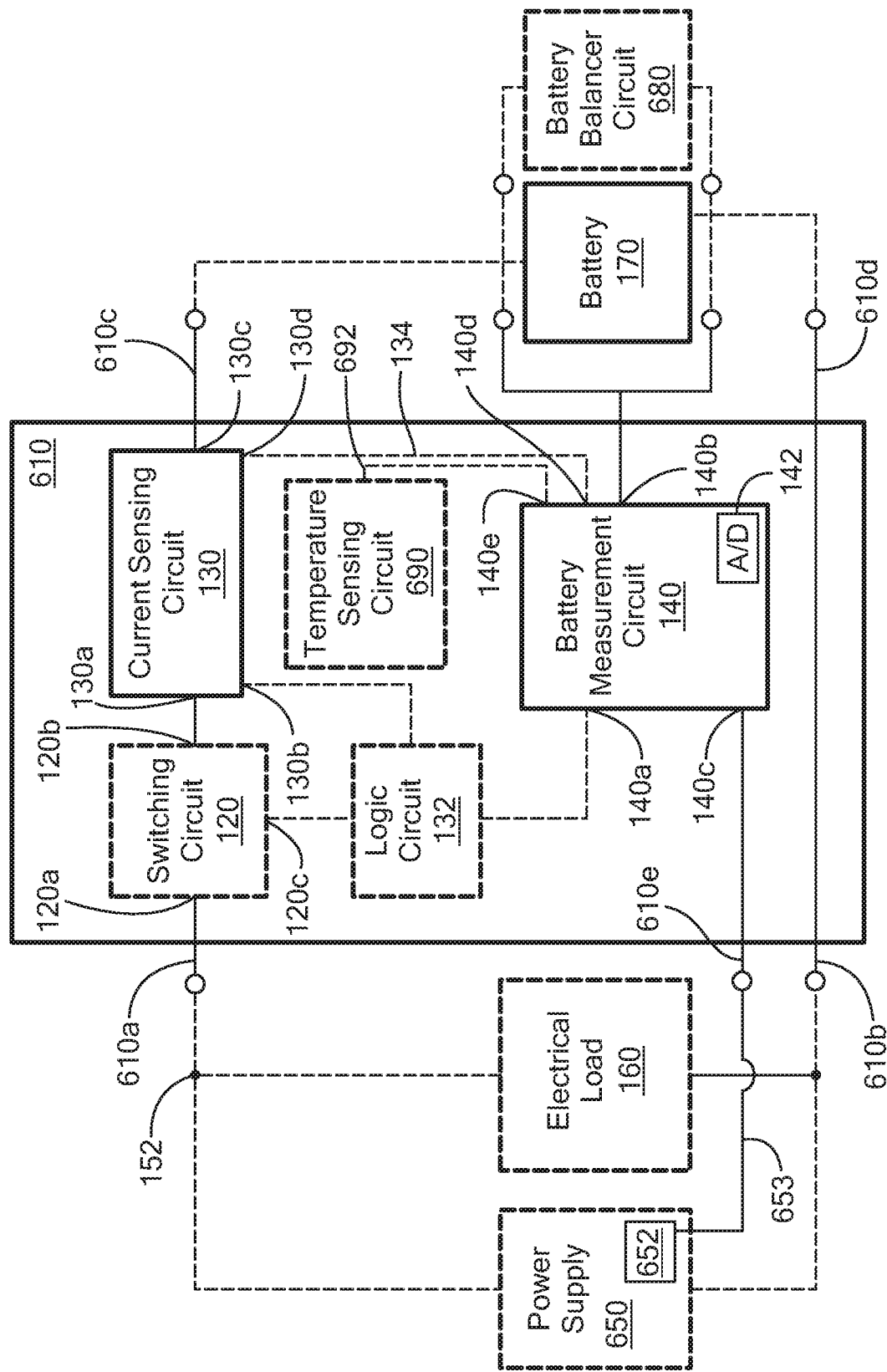
FIG. 6 is block diagram of another example circuit including a battery management circuit.

Referring now to FIG. 6, in which like elements of FIG. 1 are provided having like reference designations, another example circuit includes a controllable power supply 650, an electrical load 160 and a battery pack (or battery string) 170. The circuit also includes a battery management circuit 610 for managing the power supply 650 and the battery pack 170 and a battery balancer circuit 680 for balancing charges between one or more batteries of the battery pack 170. Battery balancer circuit 680 is optional in some embodiments and, thus, is shown in phantom.

Controllable power supply 650 (e.g., a direct-current (DC) power supply), similar to power supply 150 of FIG. 1, has a first terminal coupled to a first terminal of the electrical load 160 and a second opposing terminal coupled to a second opposing terminal of the electrical load 160. In the illustrated embodiment, the power supply 650 also includes a power supply controller 652 which may be separate from or integrated with power supply 650. A control terminal 653 is coupled to an input of the power supply controller 652 and a corresponding terminal of the battery management circuit 610, as will be discussed.

Battery management circuit 610, similar to battery management circuit 110 of FIG. 1, includes a switching circuit 120, a current sensing circuit 130 and a logic circuit 132. In the illustrated embodiment, battery management circuit 610 also includes a battery measurement circuit 640 and a temperature sensing circuit 690. The switching circuit 120, logic circuit 132 and temperature sensing circuit 690 are optional in some embodiments and may be provided separate from battery management circuit 610 in some embodiments and are, thus, shown in phantom. In one embodiment, battery management circuit 610 includes switching circuit 210 when the battery management circuit 610 is coupled to two or more battery packs or strings (e.g., 170). Switching circuit 210 may, for example, isolate each battery string of the two or more battery strings from the power supply 650.

Battery management circuit 610 has a first terminal 610*a* coupled to a first terminal of power supply 650 and to a first terminal of electrical load 160. Battery management circuit 610 also has a second terminal 610*b* coupled to a second terminal of power supply 650 and to a second terminal of electrical load 160. Battery management circuit 610 additionally has third and fourth terminals 610*c*, 610*d* coupled to first and second opposing terminals of battery pack 170. In the illustrated embodiment, battery management circuit 610 also has a fifth terminal 610*e* coupled to the control terminal of the power supply 650 in a so-called "closed loop" arrangement.

Power supply 650 generates a supply voltage for use by the electrical load 160 and for charging the battery pack 170, if necessary. In the event the power supply 650 fails to provide a necessary supply voltage to the electrical load 160 (e.g., during a power failure), battery pack 170 supplies some or all of the necessary supply voltage to the electrical load 160. Here, however, under a "normal" operating condition, where the power supply 650 is able to provide a necessary supply voltage to the electrical load 160, the battery management circuit 610 controls a voltage level of the supply voltage (e.g., for charging, resting, evaluating, and/or reducing dry-out or corrosion of batteries in the battery pack 170).

Specifically, battery measurement circuit 140 of battery management circuit 610 controls (i.e., adjusts) the voltage level of the power supply voltage based upon one or more measurements made by the battery measurement circuit 140 and/or one or more signals received by the battery measurement circuit 140.

As noted above in conjunction with FIG. 1, the battery measurement circuit 140 is configured to measure one or more characteristics of battery pack 170 (e.g., voltage measurements of battery pack 170, state of charge (SOC) and/or state of health (SOH) characteristics of battery pack 170, or of individual batteries in the battery pack 170). Additionally, the battery measurement circuit 140 is coupled to receive a current sense control signal from the current sensing circuit 130. The battery measurement circuit 140 is also coupled to receive a temperature sense control signal from temperature sensing circuit 690 in the illustrative embodiment of FIG. 6.

Current sensing circuit 130, which has a first terminal 130*a* coupled to a second terminal 120*b* of switching circuit 120 of the battery management circuit 610, is configured to measure a direction, a magnitude and/or a polarity of current signals passing through switching circuit 120 (which may be the same as or similar to any of the switching circuits described in the figures above). In some embodiments, the switching circuit 120 is provided as at least one of a power switch, a switching semiconductor (e.g., a MOSFET), an electromechanical relay and an electromechanical contactor (e.g., an LVBD contactor). In embodiments in which an LVBD contactor is used, the contactor would be paralleled with a diode or a group of diodes (e.g., a diode array). The diode function is a function that is generally inherent in MOSFET devices.

In particular, if a contactor were used, a diode or group of parallel diodes would be placed across the contactor such that batteries would supply power in a contiguous manner if the power supply 650 dropped out. In a minimal scenario, a switch function is not needed due to the battery measurement circuit 140 being coupled to the power supply 650 in a closed loop arrangement (e.g., the switch function may be reduced or ideally eliminated by using the closed loop voltage control to essentially provide the same functionality that "switched" products possess). In some embodiments, switching circuit 120 may be eliminated by operation of the power supply control functionality provided by the battery measurement circuit 140, where the battery management circuit 610 and battery measurement circuit 140 essentially perform the functions of the switching circuit 120. In response to measuring the current signals, the current sensing circuit 130 may generate and provide a current sense control signal indicative of the measured current signals to a corresponding input of battery measurement circuit 140 of the battery management circuit. As noted above in conjunction with FIG. 1, the current sense control signal may control measurement of one or more characteristics of the battery pack 170, measurement of current flow rate, and/or charge into and out of the battery pack 170.

Temperature sensing circuit 690, which has a terminal coupled to a corresponding terminal of the battery measurement circuit 640, is configured to measure ambient temperature proximate to the battery pack 170. Temperature sensing circuit 690 is also configured to provide a corresponding temperature signal indicative of the measured temperature to the battery measurement circuit 640. The battery measurement circuit 640 may, in turn, use one or more of the measurements (e.g., voltage measurements) made by the battery measurement circuit 640, the current sense control signal received from current sensing circuit 130, and the temperature signal from the temperature sensing circuit 690 to determine a voltage level (or amount) by which the voltage level of the supply voltage should be adjusted. In particular, the voltage level may be adjusted by providing a power supply control signal to the control terminal of the power supply 650.

Additionally, the voltage level may, for example, be adjusted (e.g., increased) to charge one or more of the batteries in battery pack 170 during a battery charge operation and to substantially reduce (or ideally minimize) corrosion of the battery pack 170 (e.g., during a "normal" operating condition), as will be described further in conjunction with figures below. Further, the voltage level may be adjusted (e.g., decreased) during a battery discharge operation (e.g., to test battery capacities and/or state of health (SOH) of one or more of the batteries in the battery pack 170). Control of the power supply voltage allows systems operating in accordance with the concepts described herein for the controlling of charging rates of the batteries, maximizing battery life, by managing the charging current level(s). This may reduce internal heating and gassing during charging. In other words, the voltage level may be adjusted in a closed loop manner such that particular battery management functions are achieved (e.g., such that the battery management circuit draws small and short duration current from at least one of the one or more battery strings during a battery discharge operation).

In one embodiment, the battery pack 170 is a single battery pack (or string) and the voltage level of the supply voltage is controlled such that the battery management circuit 610 is capable of substantially eliminating current flow through the single battery string 170 without the switching circuit 120. The foregoing is one example result of the coupling of the battery management circuit 610 and the power supply 650 in the closed loop arrangement.

Battery balancer circuit 680, which is shown as having a first terminal coupled to the first terminal of battery pack 170 and a second terminal coupled to the second terminal of the battery pack 170 in the illustrated embodiment, is, in actuality, coupled to each battery (or cell) of the battery pack 170. Battery balancer circuit 680 may, for example, balances charges of the batteries in the battery pack 170 by performing charge transfers between the batteries. This may, for example, extend battery run time of the battery pack 170 as well as battery life of the battery pack 170. Operation of battery balancing circuits is conventional in the art and, therefore, is not described in detail herein.

Additional aspects of the circuit of FIG. 6, particularly operation thereof, will described further in conjunction with figures below. It should be appreciated that there is substantially no restriction to the number of batteries (e.g. series batteries) that can be managed in a single battery bank or string (e.g. 170, shown in FIG. 6). Substantially any number of batteries may be provided.

Figure 6A:
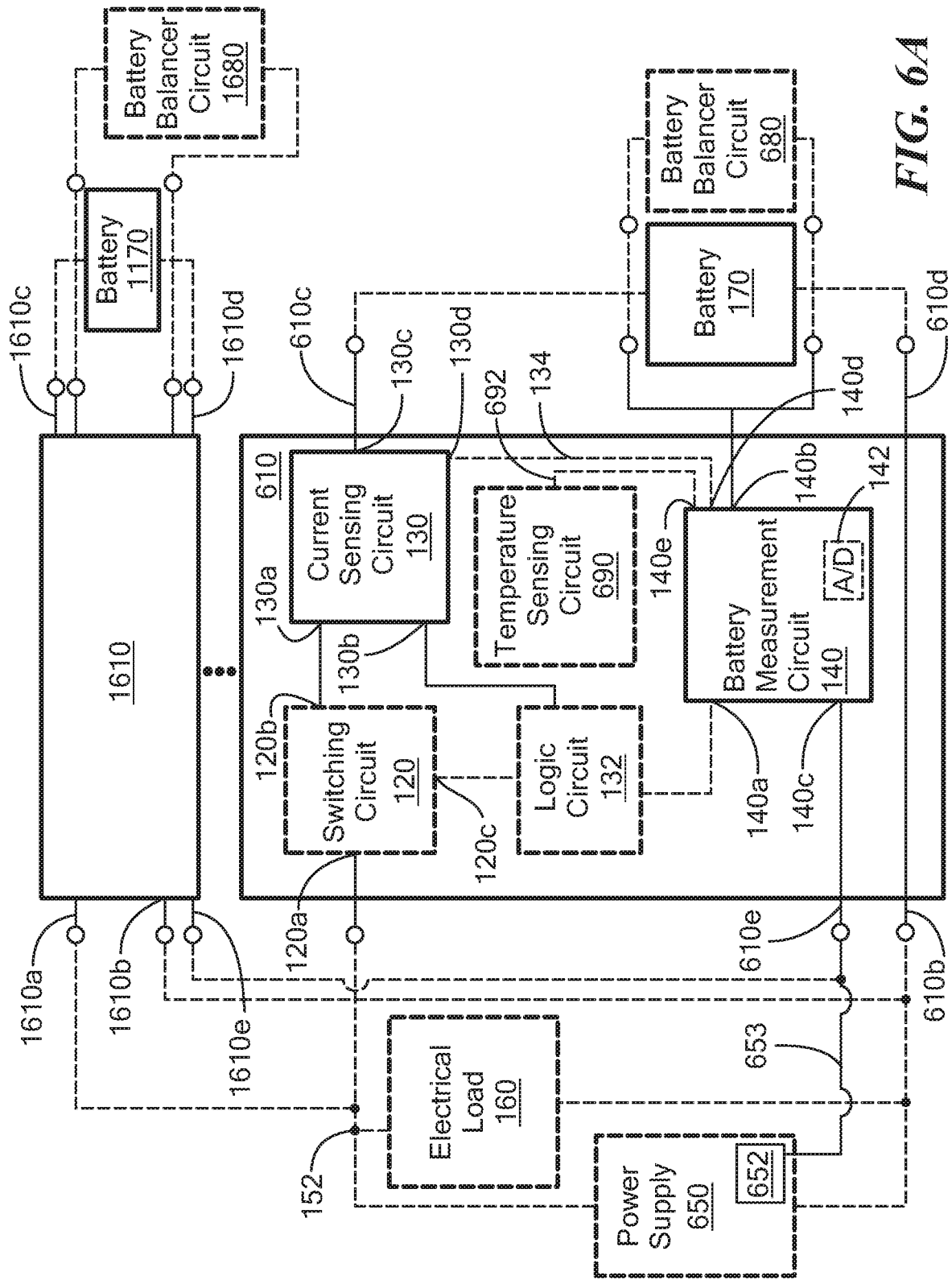
FIG. 6A is block diagram of another example circuit including a plurality of battery management circuits.

Referring now to FIG. 6A, another example circuit is shown. The circuit includes power supply 650 and electrical load 160. The circuit also includes N number of battery packs (here, battery packs 170, 1170) and N corresponding battery management circuits (here, battery management circuits 610, 1610) in the illustrated embodiment. In some embodiments, however, a greater number of battery management circuits may exist than battery packs, and vice versa (e.g., a circuit including five battery packs may have four battery management circuits).

Battery management circuit 1610, which may be the same as or similar to battery management circuit 160, has a first terminal 1610a coupled to the first terminal of power supply 650 and to the first terminal of electrical load 160. Battery management circuit 1610 also has a second terminal 1610b coupled to the second terminal of power supply 650 and to the second terminal of electrical load 160. Battery management circuit 1610 additionally has third and fourth terminals 1610c, 1610d coupled to first and second opposing terminals of battery pack 1170, which may be the same as or similar to battery pack 170. In the illustrated embodiment, battery management circuit 1610 further has a fifth terminal 1610e coupled to the control terminal of power supply 650.

Similar to the circuit shown in FIG. 6, the power supply 650 generates a supply voltage for use by the electrical load 160 and the battery management circuit 610 controls a voltage level of the supply voltage (e.g., for charging the battery pack 170). Here, however, battery management circuits 610, 1610 both control the voltage level of the supply voltage (e.g., for charging battery packs 170, 1170). Additionally, in the event the power supply 650 fails to provide the necessary supply voltage to the electrical load 160 (e.g., during a power failure), battery pack 170, battery pack 1170 and/or one or more other battery packs in the circuit (not shown) may collectively or selectively supply some or all of the necessary supply voltage to the electrical load 160. In one embodiment, for example, during a power failure select ones of the battery packs (e.g., 170, 1170) in the circuit (e.g., as may be determined by the battery management circuits) supply the supply voltage to the electrical load 160. In one embodiment, when a switch function is used, the system can selectively charge individual batteries of strings of batteries, to get each one (ideally) charged, without over-charging those already fully charged. Without switches or switching functions provided by the battery management circuit 610 or battery measurement circuit 140, parallel strings or batteries may endure a same charge energy, possibly overcharging some batteries, defeating one purpose of the battery management circuit 610.

Figure 7:
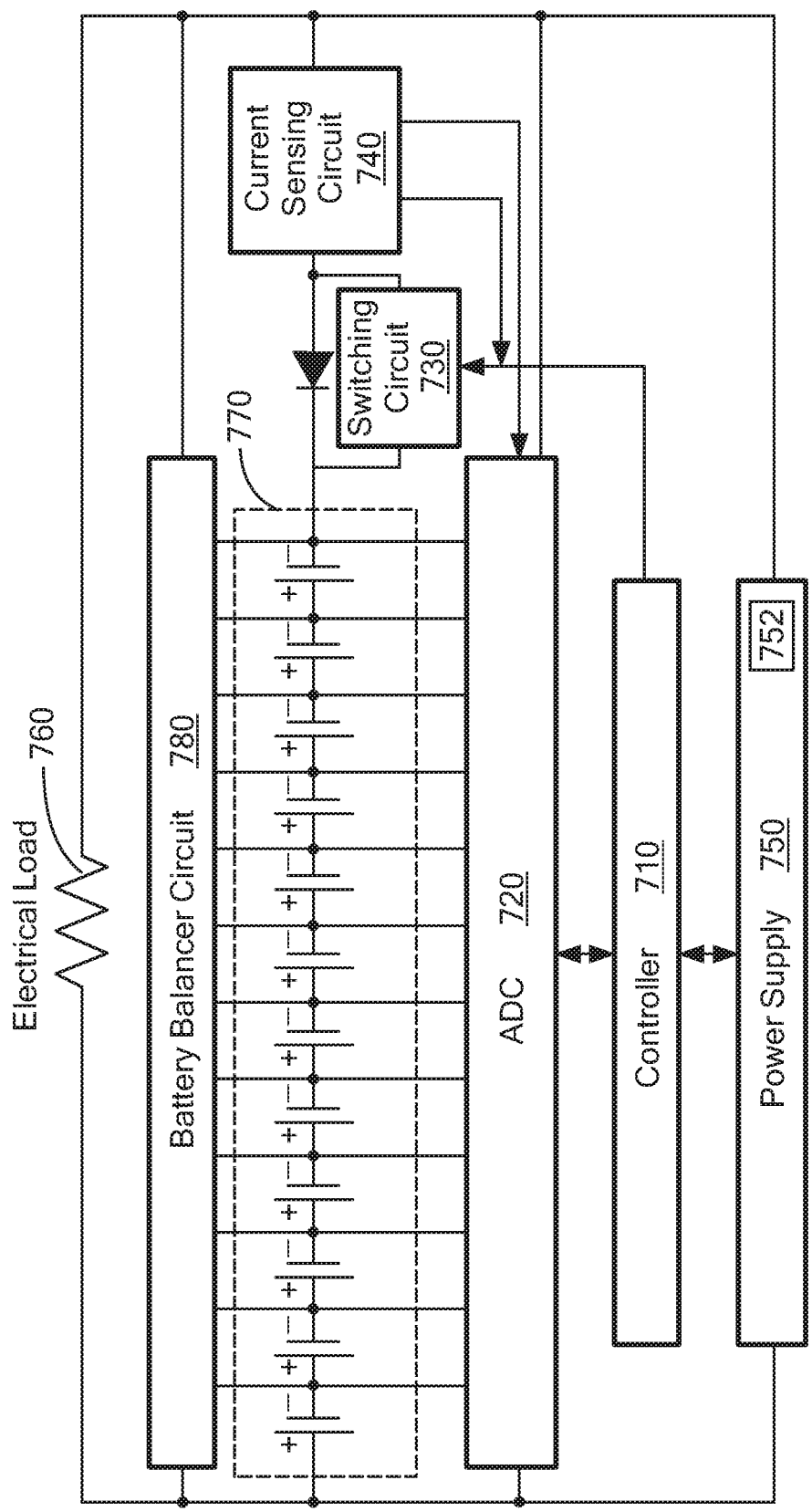
FIG. 7 is block diagram of another example circuit including a battery management circuit.

Referring now to FIG. 7, another example circuit includes a power supply 750, an electrical load 760 and a battery string (or battery pack) 770 including a plurality of batteries (e.g., series and/or parallel coupled). The circuit also includes a controller 710, an analog-to-digital converter (ADC) 720, a switching circuit 730 and a current sensing circuit 740, one or more of which may be provided as part of a battery management circuit in accordance with the concepts, systems, circuits and techniques sought to be protected herein. The ADC 720 and the switching circuit 730 are optional in some embodiments.

Power supply 750, which may be the same as or similar to power supply 650 of FIG. 6, includes a power supply controller 752 and has a first terminal coupled to a first terminal of ADC 720, a first terminal of battery string 770, a first terminal of battery balancer circuit 780, and a first terminal of electrical load 760. Power supply 750 also has a second terminal coupled to a second terminal of ADC 720, a second terminal of current sensing circuit 740, a second terminal of battery balancer circuit 780, and a second terminal of electrical load 760. Power supply 750 additionally has a third, control terminal coupled to a corresponding terminal of controller 710.

Controller 710, similar to battery measurement circuit 610 of FIG. 6, is coupled to the power supply 750 in a closed loop arrangement and configured to control a voltage level of a supply voltage generated by the power supply 750 based upon one or more measurements made by the controller 710 and/or signals received by the controller 710. In the illustrated embodiment, the controller 710 is coupled to ADC 720 which monitors a voltage of the battery string 770 and voltages of the batteries in the battery string 770. The ADC 720 is coupled to receive a voltage signal from each of the batteries and is configured to provide a corresponding converted digital signal to the controller 710. The converted digital signal may, for example, be used to determine a voltage (e.g., a measured voltage) of each of the batteries in the battery string 770.

In the illustrated embodiment, the controller 710 is also coupled to current sensing circuit 740, which may be the same as or similar to current sensing circuit 130 of FIG. 6. The current sensing circuit 740 is coupled to receive current signals from battery string 770 at a first input and is configured to measure a magnitude and a direction of current flowing through the battery string 770 as represented by the current signals. The current sensing circuit 740 also provides a corresponding current sense signal indicative of the measured current flow to ADC 720. The ADC 720, in turn, provides a corresponding converted digital signal to the controller 710 for processing.

In response to receiving the converted voltage signal and the converted current sense signal from the ADC 720, controller 710 may generate and provide a power supply control signal to power supply controller 750 to adjust (e.g., increase or decrease) a voltage level of the supply voltage generated by power supply 750. In one embodiment, the voltage level is adjusted in order to charge one or more of the batteries in the battery string 770, as described further below in conjunction with FIGS. 8 and 9, for example. Additionally, in one embodiment, the voltage level is adjusted to provide a predetermined amount of current (e.g., maintenance current) to the batteries in the battery string 770 for substantially reducing (or eliminating) dry-out or corrosion of the batteries, as described further below in conjunction with FIG. 10. The amount of the voltage level adjustment may, for example, be determined using one or more software algorithms in the controller 710.

Controller 710 may, for example, operate to monitor the battery string 770 (or one or more of the batteries in the battery string 770) and, based on the monitoring, may adjust the voltage level to optimize charge level and maximize battery life of the battery string 770 (e.g., by charging and resting currents). An increase in the supply voltage may, for example, cause a corresponding current increase through the battery string 770. Such controller operation may be implemented via software, hardware or through a combination of hardware and software. Additionally, a decrease in the supply voltage may cause a corresponding current decrease through the battery string 770. The supply voltage may also provide substantially zero current to the batteries, which can be used to "rest" the batteries and to take voltage measurements (e.g., virtual open circuit voltage ($V_{oc}$) measurements) using ADC 720. It should be appreciated that battery management functions are performed within the normal operating range of the batteries and the load equipment (e.g., the supply voltage is supplying just enough power to the load). In one embodiment, the batteries are rested and decoupled from the supply voltage through use of the switching circuit 730, which is may be the same as or similar to switching circuits 220 and 1220 of FIGS. 2 and 2A in some embodiments. Switching circuit 730 is coupled to controller 710 and coupled between battery string 770 and current sensing circuit 740, as shown in FIG. 7.

Once each of the batteries the battery string 770 is substantially fully charged, the controller 710 may continue to monitor voltages of the batteries in the battery string 770 with ADC 720 and current flow through the battery string 770 with the current sensing circuit 740. In charge recovery mode (e.g., a battery recharge operation subsequent to a power failure), algorithms in the controller 710 attempt to optimize current supplied to the battery string 770 while keeping the voltage level of the supply voltage within a so-called "low-stress" operating range for the electrical load 760.

The circuit of FIG. 7 also includes an optional cell balancing circuit 790, which may be a conventional (i.e., commercial off-the-shelf (COTS)) cell balancing circuit, for example. The cell balancing circuit 790 is coupled to and controlled by controller 710 and configured to measure voltages of each of the batteries in the battery string 770. The controller 710 may operate, for example, control the voltage level of the supply voltage and the cell balancing circuits 790 to ensure that no batteries in the battery string 770 are undercharged or overcharged (e.g., by removing charge from fully charged batteries and charging undercharged batteries until all batteries are fully charged). Such controller operation may be implemented, for example, via software, hardware or through a combination of hardware and software. In a so-called active mode, for example, charge from overcharged batteries is transferred to undercharged batteries, thereby conserving charge energy needed to charge the batteries.

Similar to battery management circuit 610 of FIG. 6, in one embodiment the battery management circuit of FIG. 7 (i.e., one or more of controller 710, ADC 720, switching circuit 730 and current sensing circuit 740) includes switching circuit 730 when the battery management circuit is coupled to two or more battery packs or strings (e.g., 770). Switching circuit 730 may, for example, isolate each battery string of the two or more battery strings from the power supply 750.

Additionally, in one embodiment the battery string 770 is a single battery pack (or string) and the voltage level of the supply voltage is controlled such that the battery management circuit of FIG. 7 is capable of substantially eliminating current flow through the single battery string 770 without the switching circuit 730. The foregoing is one example result of the coupling of the battery management circuit and the power supply 750 in the closed loop arrangement.

Figure 7A:
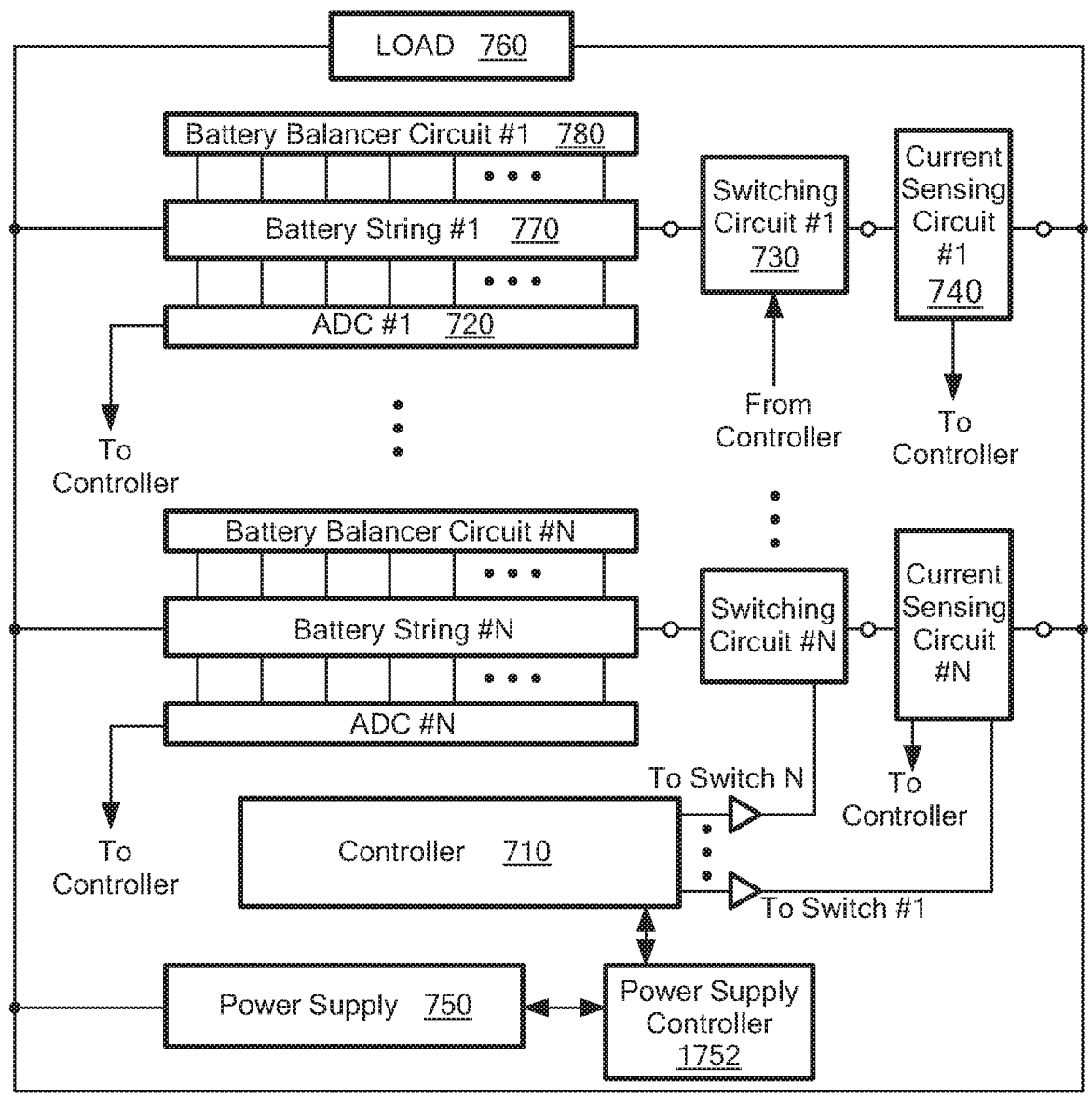
FIG. 7A is block diagram of another example circuit including a plurality of battery management circuits.

Referring now to FIG. 7A, in which like elements of FIG. 7 are provided having like reference designations, another example circuit includes controller 710, power supply 750 and electrical load 760. The circuit also includes N number of battery strings (here, battery string #1 to battery string #N), N corresponding analog-to-digital converters (here, ADC #1 to ADC #N), N corresponding current sensing circuits (here, current sensing circuit #1 to current sensing circuit #2), N corresponding battery balancer circuits (here, battery balancer circuit #1 to battery balancer circuit #N) and N corresponding switching circuits (here, switching circuit #1 to switching circuit #N) in the illustrated embodiment. In some embodiments, however, a greater number of ADCs, current sensing circuits, battery balancer circuits and/or switching circuits may exist than battery strings, and vice versa (e.g., a circuit including five battery strings may have four ADCs, four current sensing circuits, four battery balancer circuits and four switching circuits). When there are less ADCs, current sensing circuits, battery balancer circuits and/or switching circuits than battery strings, the ADCs, current sensing circuits, battery balancer circuits and/or switching circuits may, for example, be selectively multiplexed to the battery strings. Multiplexing is conventional in the art and, thus, is not described in detail herein.

In the illustrated embodiment, each ADC (e.g., ADC #1), current sensing circuit (e.g., current sensing circuit #1), battery balancer circuit (e.g., battery balancer circuit #1) and switching circuit (e.g., switching circuit #1) is coupled to the controller 710. Each ADC provides a converted digital signal to a corresponding input of the controller 710, each current sensing circuit provides a current sensing signal to a corresponding input of the controller 710, each battery balancer circuit provides a battery balancing signal to a corresponding input of the controller 710, and each switching circuit receives a switch control signal from a corresponding output of the controller 710.

Similar to controller 710 of FIG. 7, controller 710 of FIG. 7A is configured to control a voltage level of a supply voltage generated by the power supply 750 based upon one or more measurements made by the controller 710 (e.g., voltage measurements through ADC 720) and/or signals received by the controller 710 (e.g., current sense signals received from current sensing circuit 740). Here, however, the controller 710 controls the voltage level of the supply voltage by providing power supply control signals to power supply controller 1752, which is coupled to but provided external to the power supply 750 in the illustrated embodiment. Additionally, here, the controller 710 controls the voltage level of the supply voltage for each battery string in the circuit. In one embodiment, the voltage level of the supply voltage is controlled for each battery string in the circuit using the above and below described methods (e.g., in conjunction with FIGS. 8-10).

Figure 8:
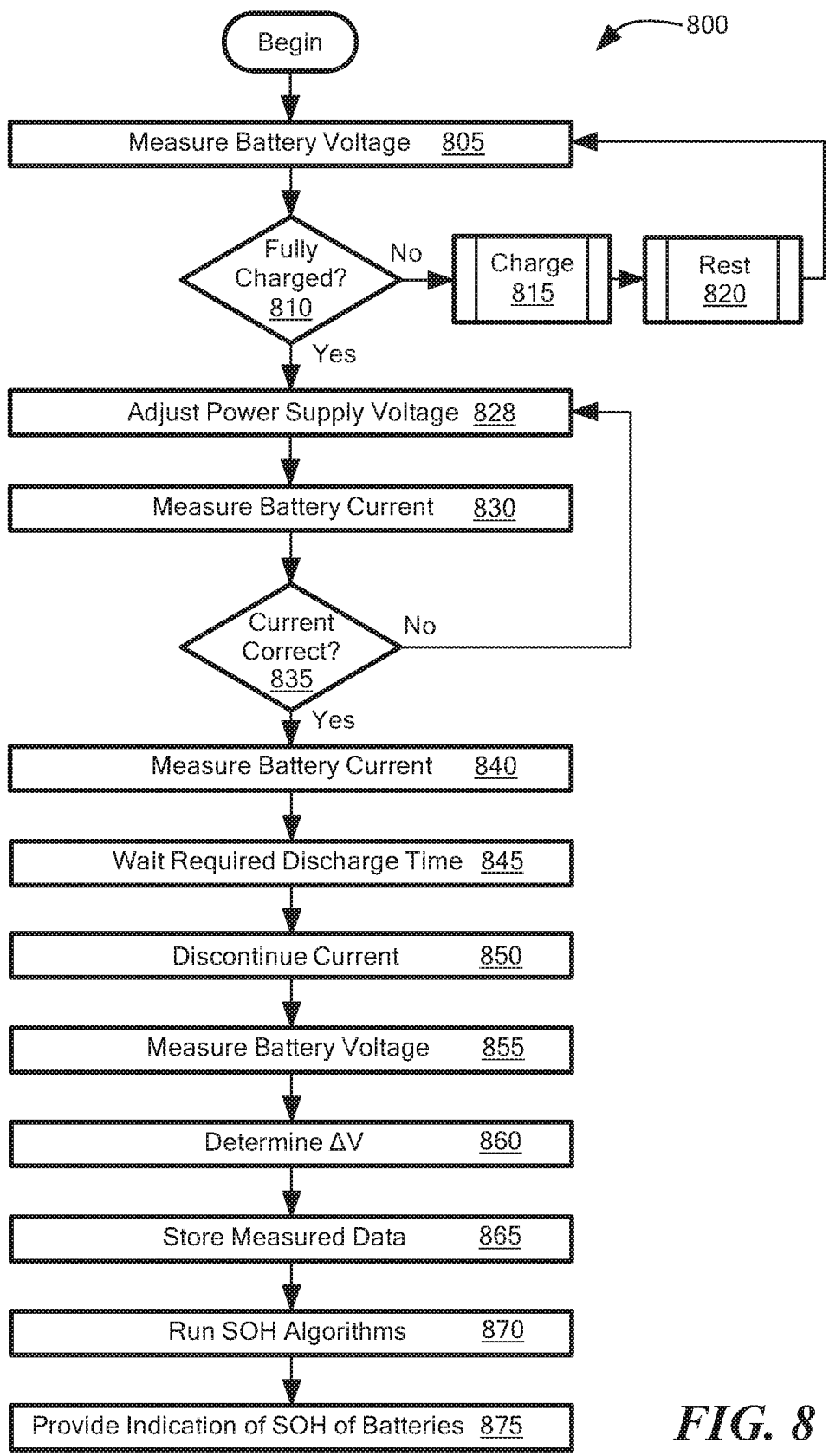
FIG. 8 is a flowchart illustrating an example method for managing a battery string that may be implemented in the circuits of FIGS. 6, 6A, 7 and 7A, for example.
Figure 9:
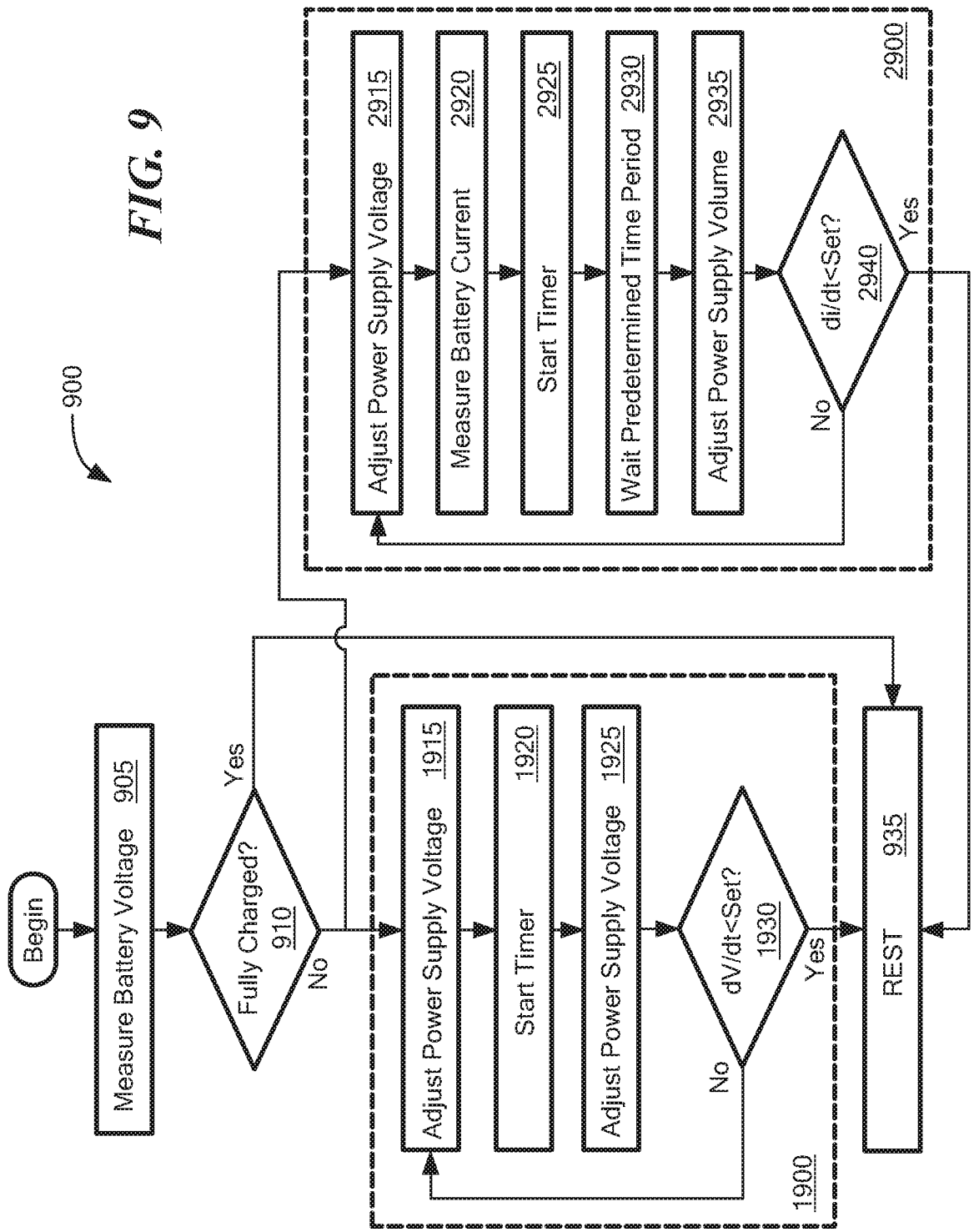
FIG. 9 is a flowchart illustrating an example method for charging a battery string that may be implemented in the circuits of FIGS. 6, 6A, 7 and 7A, for example.
Figure 10:
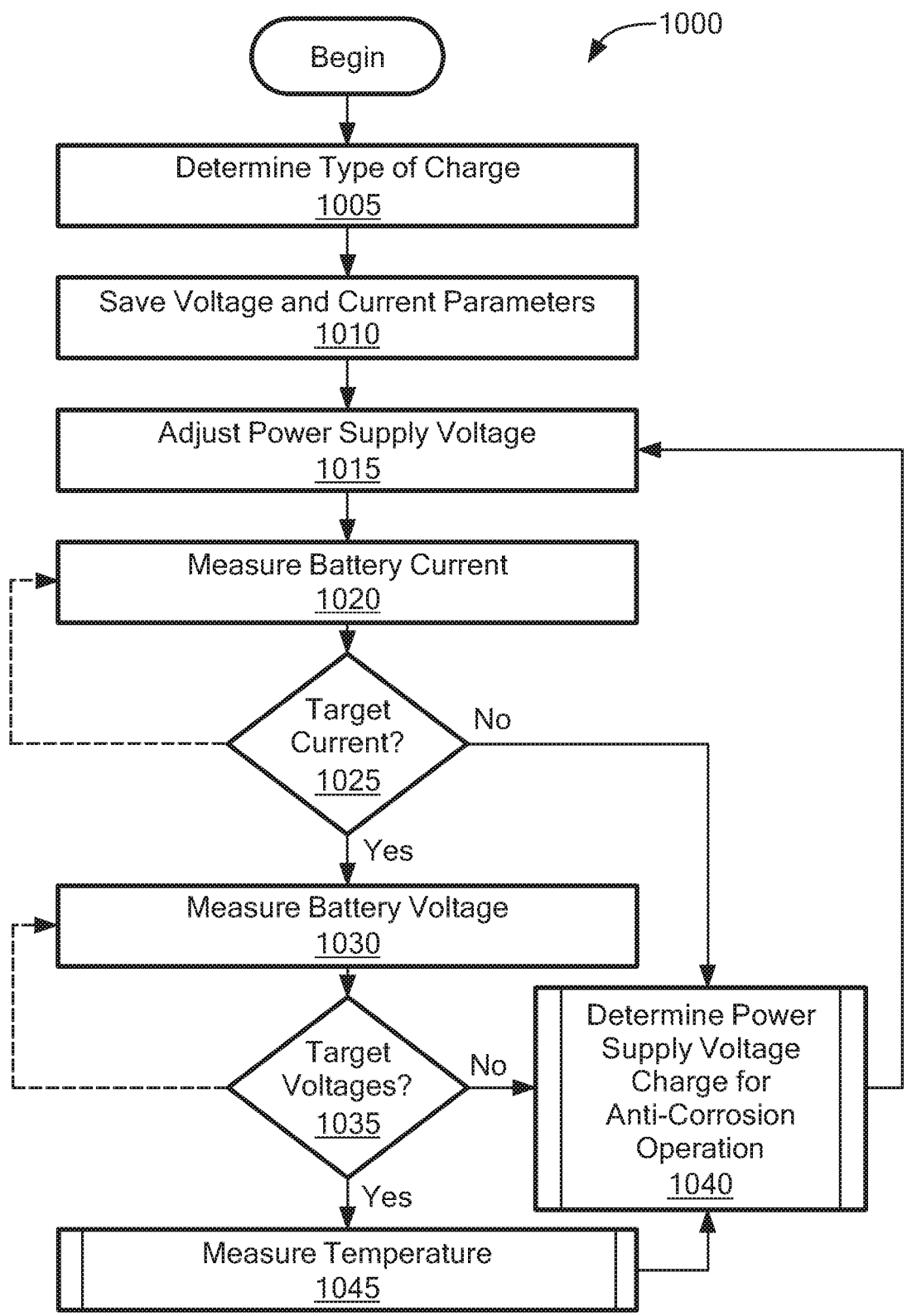
FIG. 10 is a flowchart illustrating an example method for reducing (or eliminating) corrosion of a battery string that may be implemented in the circuits of FIGS. 6, 6A, 7 and 7A, for example.

Referring to FIGS. 8-10, several flowcharts (or flow diagrams) are shown. Rectangular elements (typified by element 805 in FIG. 8), as may be referred to herein as "processing blocks," may represent computer software instructions or groups of instructions. Diamond shaped elements (typified by element 810 in FIG. 8), as may be referred to herein as "decision blocks," represent computer software instructions, or groups of instructions, which affect the execution of the computer software instructions represented by the processing blocks. The processing blocks and decision blocks can represent steps performed by functionally equivalent circuits such as a digital signal processor circuit or an application specific integrated circuit (ASIC).

The flowcharts do not depict the syntax of any particular programming language. Rather, the flowcharts illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied. Thus, unless otherwise stated, the blocks described below are unordered; meaning that, when possible, the blocks can be performed in any convenient or desirable order including that sequential blocks can be performed simultaneously and vice versa.

Referring to FIG. 8, a flowchart illustrates an example method 800 for managing (e.g., monitoring, charging and/or discharging) a battery string (e.g., 770, shown in FIG. 7) that can be implemented in a battery management circuit (e.g., 610, shown in FIG. 6). A result of the method may be improved performance and/or battery life of the battery string. The figure is also illustrating two processes. First is the charging process which ends at block 820. Second is setting the current, which could be setting to Zero Current, to rest the batteries. Then a waiting period begins for batteries to rest for a substantially long time (e.g. hours). During the wait, the system measures battery voltage behavior and adjusts current to maintain zero if resting.

As illustrated in FIG. 8, a method 800 for a battery string begins at block 805 where voltage measurement circuitry, which can be the same as or similar to the voltage measurement circuitry of FIG. 7 (i.e., controller 710 taken alone or in combination with ADC 720), measures a first voltage (e.g., an open-circuit voltage) of one or more batteries in a battery string (e.g., 770). In one embodiment, the first voltage is measured directly across the terminals (i.e., first and second terminals) of each of the batteries in the battery string (or select ones of the batteries in the battery string) to minimize voltage losses (i.e., voltage drops) which may occur between the batteries and the voltage measurement circuitry (e.g., as may occur through wire resistance). In another embodiment, the first voltage is not measured directly across the terminals of the batteries. In such embodiment, any voltage loss which may occur between the batteries and the voltage measurement circuitry is accounted for through use of a voltage drop constant. The voltage drop constant may, for example, be computed through knowledge of a voltage drop occurring between the batteries and the voltage measurement circuitry.

At block 810, a battery measurement circuit, which can be the same as or similar to the battery measurement circuit of FIG. 7 (i.e., controller 710 taken alone or in combination with ADC 720), determines a state of charge (SOC) of the batteries (i.e. if the batteries in the battery string are fully charged (or substantially fully charged)) based upon a comparison of the measured first voltage (e.g. an open circuit with a factor added or subtracted due to battery temperature) with a predetermined voltage value. In one embodiment, the batteries should rest for some period of time such that their voltage settles. Additionally, the predetermined voltage value may, for example, be a substantially fixed voltage value or a voltage value which changes based, at least in part, on the condition and environment of the batteries. If the battery measurement circuit determines that the batteries are fully charged, the method proceeds to a block 825. Alternatively, if the battery measurement circuit determines that the batteries are not fully charged (or substantially fully charged), such as may be determined based on a measured DC resistance of a batteries, the method proceeds to a block 815.

At block 815, a current source, which can be the same as or similar to the power supply current source described in conjunction with figures above, provides current (e.g., a maintenance or charge current) to the batteries for a predetermined (i.e., fixed) time period (e.g., ten seconds). If the first voltage of the batteries is below a fixed threshold, one or more of the batteries may be charged in accordance with a charge routine, for example, which may include:

Start charging of the batteries;
Charge the batteries for a charge time (e.g., a variable charge time);
Subsequent to the charge time, measure voltage(s) of the batteries;
Compare the measured voltage(s) to a previously measured voltage(s);
If a difference between the voltages (i.e., the measured voltage(s) and the previously measured voltage(s)) is less than a predetermined difference value, then end charge; and
If the difference is greater than the predetermined difference value, then charge one or more of the batteries again for a charge time.

In one embodiment, the current (e.g., charge current based on the charge routine) is provided to the batteries substantially immediately after the voltage measurement circuitry measures the first voltage of the batteries. Additionally, in one embodiment, the current is a substantially constant current (e.g., a precise, fixed constant current) having a predetermined current value (e.g., one ampere (1 A)). The predetermined current value may, for example, be determined by a value required to yield a "meaningful" voltage drop in the battery, such that the drop can be repeatedly and accurately measured. Larger batteries, for example, may need more current passed through them to yield an accurate measurement. Also, discharge time can be increased to provide additional voltage drop, for a reliable measurement. The predetermined current value and/or the predetermined time period may also be empirically selected in some embodiments. A 1 A constant current was, for example, empirically determined to be suitable for a first range of batteries (e.g., 20 A to 200 A batteries). Additionally, a 10 A constant current was empirically determined to be suitable for a second range of batteries (e.g., batteries greater than 200 A). In some instances, the 10 A current value may be higher, which may necessitate an effort to recycle the energy.

At block 820, after the predetermined time period, the current source discontinues providing current to the batteries and, at block 805 the voltage measurement circuitry measures the first voltage of the batteries again. In one embodiment, the first voltage is measured substantially immediately after the current source discontinues providing current to the batteries where the current source is used for measuring DC resistance. At block 810, the battery measurement circuit determines if the batteries are fully charged (or substantially fully charged) based upon a comparison of the measured first voltage with a predetermined voltage value. If the battery measurement circuit determines that the batteries are fully charged, the method proceeds to a block 825. Alternatively, if the battery measurement circuit determines that the batteries are still not fully charged (or substantially fully charged), blocks 815, 820 and 805 are repeated again.

At block 825, the battery measurement circuit provides a power supply control signal to a power supply controller, which may be the same as or similar to power supply controller 752 shown in FIG. 7, to adjust (i.e., control) a voltage level of a supply voltage generated by a power supply (e.g., 750, shown in FIG. 7). In one embodiment, the voltage level is adjusted (e.g., decreased) during a battery discharge operation (e.g., a battery capacity test) to provide a predetermined amount of discharge current through each of the batteries in the battery string. The predetermined amount of discharge current may, for example, be a same value or values determined for the current source previously described. Such closed loop current setting is a functional equivalent of the discrete current source circuits used in conventional battery management circuit and systems.

For example, the voltage level may be adjusted by the power supply control signal such that the battery management circuit draws so-called "small" and "short" duration current from the batteries (or at least one of the battery strings) during the battery discharge operation. As one example, the "small" current draw can be between about zero point five and about one point five amps. Additionally, the "short" duration of the current draw can be for up to tens of seconds (e.g., less than about one second to about 20 seconds) such that the batteries are discharged, but not completely or substantially completely discharged (e.g., to end of discharge voltage). It should be appreciated that the current draw and duration of the current draw can vary, for example, based on battery type.

The discharge is used to produce a voltage drop in the batteries, so that a battery internal resistance can be determined. If the batteries are loaded for a few seconds, the voltage may be measured (loaded voltage), the load (current) removed, the voltage substantially immediately measured again (i.e., with substantially no-load voltage), and a voltage difference may be calculated. This voltage difference, divided by the load current used, gives the battery internal resistance, by Ohm's Law (R=V/I). The power supply voltage adjustment may be used to drop the supply voltage, such that the batteries start to supply the load current. This current may be held substantially constant by the closed-loop nature of the current measurement feeding information back to the controller, and the controller sending voltage adjustment messages via the power supply control signal to the power supply to hold the current constant.

It should be appreciated that the power supply control signal can be an analog, digital, or mixed signal indicative of an amount by which the voltage level needs to be adjusted (i.e., increased or decreased). The type of signal (e.g., analog, digital, or mixed signal) may, for example, be based on acceptable input signal type(s) of the power supply controller 752.

At block 830, a current sensing circuit, which can be the same as or similar to the current sensing circuit 740 shown in FIG. 7, measures a magnitude of current flow through the battery string (or of each battery in the battery string) The current sensing circuit may also measure direction of current flow. Additionally, the current sensing circuit provides a current sensing signal corresponding to the magnitude of the current (or simply "current magnitude") to a corresponding input of the battery measurement circuit. At block 835, the battery measurement circuit processes the current sensing signal and determines if the current magnitude is substantially equal to a first current value. Current for DC resistance measurement falls within the small windows described previously. For determining charging currents, many factors are involved, including battery size, temperature, SOC, available power supply current, etc. If the battery measurement circuit determines that the current magnitude is substantially equal to the first current value, the method proceeds to a block 840. Alternatively, if the battery measurement circuit determines that the current magnitude is not substantially equal to the first current value, the method returns to block 825 and blocks 825, 830 and 835 are repeated.

At block 840, the current sensing circuit measures average current flow through each of the batteries in the battery string and, at block 845 the current source (e.g., a static current source) continues providing current (e.g., a discharge current) to the batteries for a predetermined discharge time period as may be suitable for measuring DC resistance. At block 850, after the predetermined discharge time period, the current source discontinues providing current to the batteries and, at block 855 the voltage measurement circuitry measures a second voltage of the batteries. In one embodiment, the second voltage of the batteries is measured substantially immediately after the current source discontinues providing current to the batteries. Additionally, the second voltage of the batteries may be measured in a similar manner as the first voltage of the batteries (e.g., directly across the terminals of the batteries).

At block 860, the battery measurement circuit determines a voltage difference ($\Delta V$) between the first voltage and the second voltage of each of the batteries. At block 865, the voltage difference is stored in a memory device (e.g., EEPROM or flash memory) in the battery measurement circuit. At block 870, in response to knowing the voltage difference and the average current measured by the current sensing circuitry at block 840, the battery measurement circuit determines a state of health (SOH) of the batteries (e.g., through use of one or more software algorithms in the battery measurement circuit). In one embodiment, the battery measurement circuit is able to determine the SOH of the batteries by computing a characteristic resistance of the batteries (i.e., characteristic resistance=$|\Delta V/I|$) and using the characteristic resistance as at least one SOH characteristic in determining the SOH of the batteries.

At block 875, in response to determining the SOH of the batteries, the battery measurement circuit may provide an indication of the SOH of the batteries. The indication may be a visual indication, for example, such as may be provided through one or more light emitting diodes (LEDs) or a display (e.g., a monitor). It should be appreciated that the DC resistance measurement is one of several key elements to determination of SOH. If a battery is flagged as bad, the processor may provide a message (e.g., based on program parameters) to a pc or a phone of a maintenance person, manager, etc. that oversees management of the batteries. A bad battery may also be indicated on a software dashboard, in a product web interface and/or in a software interface of associated battery management software of the battery management system (e.g., 610, shown in FIG. 6).

Subsequent to block 875, the method 800 may end. The method ending may, for example, be indicative of the SOH of each battery in the battery string having been determined. In one embodiment, the method 800 may be repeated continuously, periodically, or in response to a control signal (e.g., a control signal as may be provided to the battery management circuit or battery measurement circuit) depending on system and application requirements. The method 800 may be repeated, for example, to determine the SOH of the batteries in the battery string again, or to determine the SOH of other batteries (or battery strings) in the circuit including the battery management circuit. As described above, the circuits described herein may include one or more battery strings (or battery banks) with each of the battery strings including one or more batteries.

Referring also to FIG. 9, a flowchart illustrates an example method 900 for charging a battery string (e.g., 770, shown in FIG. 7) that can be implemented in a battery management circuit (e.g., 610, shown in FIG. 6) and alone or in combination with the method 800 of FIG. 8. The method 900 includes a first sub-method 1900 for dV/dt charging (i.e., change in voltage over time charging) and a second sub-method 2900 for dI/dt charging (i.e., change in current over time charging) which may be implemented alone or in combination. A result of method 900, similar to method 800, may be improved performance and/or battery life of the battery string (e.g., due to reduced temperature dependency during a charge).

As illustrated in FIG. 9, a method 900 for charging a battery string begins at block 905 where voltage measurement circuitry (e.g., processor 710 taken alone or in combination with ADC 720) measures a voltage (e.g., an open-circuit voltage) of one or more batteries in a battery string (e.g., 770). Similar to method 800, in one embodiment the voltage is measured directly across the terminals (i.e., first and second terminals) of each of the batteries in the battery string (or select ones of the batteries in the battery string) in differential measurement arrangement to reduce and ideally minimize voltage losses (i.e., voltage drops) which may occur between the batteries and the voltage measurement circuitry (e.g., as may occur through drops between inter-battery wiring.

At block 910, a battery measurement circuit (e.g., controller 710 taken alone or in combination with ADC 720) determines if the batteries in the battery string are fully charged (or substantially fully charged) based upon a comparison of the measured voltage with a predetermined voltage value. The predetermined voltage value may, for example, be a substantially fixed voltage value or a voltage value which changes based, at least in part, on the battery temperature. If the battery measurement circuit determines that the batteries are fully charged, the method proceeds to a block 935 where the batteries are placed in a resting state (i.e., an open circuit condition). The batteries may, for example, remain in the resting state (i.e., a zero charge current state) for a predetermined time period or until the batteries are needed (e.g., during a battery discharge operation or a power failure). Alternatively, if the battery measurement circuit determines that the batteries are not fully charged (or substantially fully charged), the method proceeds to either a sub-method 1900 or a sub-method 2900 (and either a block 1915 or a block 2915) based on whether dV/dt or dI/dt charging is being used. Sub-method 1900 includes blocks 1915, 1920, 1925 and 1930. Additionally, sub-method 2900 includes blocks 2915, 2920, 2925, 2930, 2935 and 2940.

If dV/dt charging is being used, the method proceeds to a sub-method 1900 and a block 1915. At block 1915, the battery measurement circuit provides a first control signal (e.g., analog, digital or mixed signal) to a power supply controller (e.g., 752, shown in FIG. 7) to adjust a voltage level of a supply voltage generated by a power supply (e.g., 750, shown in FIG. 7). In one embodiment, the voltage level is adjusted (i.e., increased or decreased) to provide a predetermined amount of charge current to each of the batteries in the battery string. This predetermined amount of charge current is determined based on a battery SOH calculation. At block 1920, a timer (e.g., a process timer) in the battery measurement circuit begins to count time, for example, once the voltage level of the supply voltage has been adjusted. The time at which the voltage level of the supply voltage has been adjusted may, for example, correspond to a reference point in time. At block 1925, the battery measurement circuit provides a second control signal to the power supply controller to adjust the voltage level of the supply voltage such that substantially no current (i.e., zero battery current) is provided to the batteries as a result of the supply voltage. Zero current allows for the assessing of the electrochemical behavior of the batteries, at rest (no current flow).

At block 1930, the voltage measurement circuitry measures a second voltage of the batteries and determines if each of the batteries has experienced a change in voltage over time (dV/dt) which is less than a predetermined (or set) change in voltage over time. Specifically, the battery measurement circuit determines a voltage difference ($\Delta V$) between the first voltage and the second voltage of each of the batteries over a predetermined time period (i.e., dt). The predetermined time period may, for example, correspond to a time period between the reference point in time and when the voltage measurement circuitry measures the second voltage of the batteries at block 1930. If the battery measurement circuit determines that the measured change in voltage over time is less than the predetermined change in voltage over time, the method proceeds to block 935. Alternatively, if the battery measurement circuit determines that the measured change in voltage over time is not less than the predetermined change in voltage over time, the method returns to block 1915 and blocks 1915, 1920, 1925 and 1930 may be repeated.

Alternatively, if dI/dt charging is being used, the method proceeds to a sub-method 2900 and a block 2915. At block 2915, similar to block 1915, the battery measurement circuit provides a first control signal to a power supply controller to adjust a voltage level of a supply voltage generated by a power supply. At block 2920, current measurement circuitry, which can be the same as or similar to the current sensing circuit of FIG. 6, measures a first current flowing through the batteries. At block 2925, a timer in the battery measurement circuit begins to count time, for example, once the voltage level of the supply voltage has been adjusted or the current measurement circuitry measures the first current. The time at which the voltage level of the supply voltage has been adjusted or the current measurement circuitry measures the first current may, for example, correspond to a reference point in time. At block 2935, after a predetermined time period at a block 2930, the battery measurement circuit provides a second control signal to the power supply controller to adjust the voltage level of the supply voltage such that substantially no current (i.e., zero battery current) is provided to the batteries as a result of the supply voltage.

At block 2940, the current measurement circuitry measures a second current of the batteries and determines if each of the batteries has experienced a change in current over time (dI/dt) which is less than a predetermined (or set) change in current over time. Specifically, the battery measurement circuit determines a current difference ($\Delta I$) between the first current and the second current of each of the batteries over a predetermined time period (i.e., dt). The predetermined time period may, for example, correspond to a time period between the reference point in time and when the current measurement circuitry measures the second current of the batteries at block 2940. If the battery measurement circuit determines that the measured change in current over time is less than the predetermined change in current over time, the method proceeds to block 935. Alternatively, if the battery measurement circuit determines that the measured change in current over time is less than the predetermined change in current over time, the method returns to block 2915 and blocks 2915, 2920, 2925, 2930, 2935 and 2940 may be repeated.

Subsequent to block 935, the method 900 (e.g., a maintenance charging method) may end. The method ending may be indicative of a maintenance charge having been completed. The method 900 may be repeated continuously, periodically, or in response to a control signal (e.g., a control signal as may be provided to the battery management circuit or battery measurement circuit) depending on system and application requirements.

Referring also to FIG. 10, a flowchart illustrates an example method 1000 for substantially reducing (or eliminating) corrosion of a battery string (e.g., 770, shown in FIG. 7) that can be implemented in a battery management circuit (e.g., 610, shown in FIG. 6) alone or in combination with method 800 of FIG. 8 and/or method 900 of FIG. 9, for example. As is known, corrosion may occur in the plates of batteries Due to over-charging A result of method 1000, which may, for example, be implemented during a "normal" operating condition (e.g., where power supply is able to provide a necessary supply voltage to the electrical load), may be improved performance and/or battery life of a battery string due to reduced or eliminated corrosion of the battery string. It should be appreciated that this sequence is invoked on fully charged batteries, to keep proper level of plate ionization.

As illustrated in FIG. 10, a method 1000 for substantially reducing (or eliminating) corrosion of a battery string begins at block 1005 where a battery measurement circuit (e.g., controller 710 taken alone or in combination with ADC 720) determines a level of current to be provided to batteries in the battery string. The type of charge may include, for example, a float charge or a boost charge, maintenance charge, balance charge. At block 1010, voltage and current parameters associated with the type of charge are stored in a memory device (e.g., EEPROM or flash memory) in the battery measurement circuit. These parameters may include minimum voltage and current levels and maximum voltage and current levels as a few examples.

At block 1015, the battery measurement circuit provides a power supply control signal (e.g., analog, digital or mixed signal) to a power supply controller (e.g., 725, shown in FIG. 7) to adjust a voltage level of a supply voltage generated by a power supply (e.g., 750, shown in FIG. 7). In one embodiment, the voltage level is adjusted (i.e., increased or decreased) to provide a predetermined amount of current (e.g., maintenance current) to each of the batteries in the battery string to minimize deterioration of the batteries (and to provide a desired anti-corrosion performance). Anti-corrosion currents may be set according to known techniques.

In accordance with one aspect of the concepts described herein, it has been discovered that at elevated temperatures, holding a certain current does not correspond with maintaining proper charge and thus it may be necessary to interrogate the batteries several times per day, to ensure proper charge level. Additionally, in one embodiment, a substantially constant voltage is provided on the electrodes or battery plates of the batteries in the battery string. In embodiments, ranges of the currents are either determined by battery manufacturers for type and size of battery, ambient temperatures also tell how to adjust currents and voltages. A key product quality is that the processes are dynamic and the systems adapt to increase (and ideally optimize) the battery SOH. For instance, if system has a battery the requires more frequent charges than other similar batteries, it attempts to optimize that battery. If the temperature starts to drop, the system will increase battery charge levels to ensure 100% charge is maintained. Charge cycle times and currents are varied by temperature and trended battery discharge rates, etc.

At block 1020, a current sensing circuit (e.g., 740, shown in FIG. 7) measures a magnitude of current flow through the battery string (or of each battery in the battery string). The current sensing circuit may also measure direction of current flow. In some embodiments, current direction is always monitored. It tells when the system is nominal or in backup mode. Additionally, the current sensing circuit provides a current sensing signal corresponding to the magnitude of the current to a corresponding input of the battery measurement circuit. At block 835, the battery measurement circuit processes the current sensing signal and determines if the current magnitude is substantially equal to a predetermined (or target) current value.

When measuring or maintaining the batteries, the current is held constant, within substantially narrow windows which may be adjusted for temperature. When charging, the system does not exert much current control until batteries are greater than 75% charged. And this is only for the approach where the system is adjusting the supply voltage within a narrow range, of a few volts. Majority of charge control is adaptive on/off, meaning the system adapts to maintain optimal charge levels. The current may be measured to calculate the amount of charge that goes into and out of the batteries. This helps to track charge efficiency, which is an SOH parameter. If the battery measurement circuit determines that the current magnitude is substantially equal to the predetermined current value, the method proceeds to a block 1030. Alternatively, if the battery measurement circuit determines that the current magnitude is not substantially equal to the predetermined current value, the method proceeds to a block 1040.

At block 1040, the battery measurement circuit determines a voltage level to provide the predetermined amount of current to minimize deterioration of the batteries. In one embodiment, the voltage level is based, at least in part, on ambient temperature proximate to the batteries as may be measured by a temperature sensing circuitry (e.g., 690, shown in FIG. 6). Subsequent to block 1040, the method returns to block 1015 and blocks 1015, 1020, 1025 and 1030 are repeated.

At block 1035, voltage measurement circuitry (e.g., controller 710 taken alone or in combination with ADC 720) measures a voltage of one or more batteries in a battery string (e.g., 770) and determines if the measured voltage is substantially equal to a predetermined (or target) voltage value. In some embodiments, the target voltage is empirically determined. If the voltage measurement circuitry determines that the measured voltage is substantially equal to the predetermined voltage value, the method proceeds to a block 1045. Alternatively, if the voltage measurement circuitry determines that the measured voltage is not substantially equal to the predetermined voltage value, the method proceeds to a block 1040.

At block 1045, temperature sensing circuitry measures and stores ambient temperature values in a memory device (e.g., EEPROM or flash memory) in the battery management circuit. Subsequent to block 1045, the method 1000 proceeds to block 1040 where the measured ambient temperature values are provided to the battery measurement circuit for processing. Additionally, subsequent to block 1040, method 1000 may end (not shown) or blocks 1015, 1020, 1025, 1030, 1035, 1040 and 1045 may be repeated a predetermined number of times. The method 1000 may also be started and stopped for other routine testing and charging regimens on the batteries to take place.

As described above and will be appreciated by one of skill in the art, embodiments of the disclosure herein may be configured as a system, method, or combination thereof. Accordingly, embodiments of the present disclosure may be comprised of various means including hardware, software, firmware or any combination thereof. Furthermore, embodiments of the present disclosure may take the form of a computer program product on a computer-readable storage medium having computer readable program instructions (e.g., computer software) embodied in the storage medium. Any suitable non-transitory computer-readable storage medium may be utilized.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above. As one example, while some of the figures show circuitry (e.g., current sensing circuit 740, shown in FIG. 7) coupled to particular terminals (e.g., a negative terminal) of a circuit element (e.g., battery string 770, shown in FIG. 7), such is shown to promote simplicity, clarity and understanding in the drawings as well as in the written description of the broad concepts, systems, circuits and techniques sought to be protected herein and are not intended to be, and should not be construed, as limiting. The concepts, systems, circuits and techniques disclosed herein may, of course, be configured and coupled in different manners than that which is shown (e.g., depending on the particular system, such as a positive ground system or a negative ground system) as will be apparent to one of ordinary skill in the art.

Accordingly, it is submitted that that scope of the patent should not be limited to the described embodiments but rather should be limited only by the spirit and scope of the following claims.

What is claimed is:

1. In a system including a power supply configured to generate a supply voltage, an electrical load configured to receive the supply voltage, and one or more battery strings comprising at least one battery, a battery management circuit for managing the power supply and the one or more battery strings, the battery management circuit having first and second terminals coupled to first and second opposing terminals of the power supply and first and second opposing terminals of the electrical load, and having third and fourth terminals coupled to first and second opposing terminals of the one or more battery strings, and having a fifth terminal coupled to a control terminal of the power supply, the battery management circuit comprising:

a current sensing circuit having a first terminal coupled to the first terminal of the battery management circuit, a second terminal coupled to the third terminal of the battery management circuit, and a third terminal, said current sensing circuit configured to:
receive a current signal from at least one of the one or more battery strings at the first terminal;
measure a magnitude of the current signal; and
provide a current sensing signal indicative of the magnitude of the current signal at the third terminal; and a battery measurement circuit having a first terminal coupled to the fifth terminal of the battery management circuit, a second terminal coupled to the third terminal of said current sensing circuit, and at least a third terminal adapted to couple to the first and second terminals of the at least one of the one or more battery strings, said battery measurement circuit configured to:
receive the current sensing signal at the third terminal;
measure one or more characteristics of the at least one of the one or more battery strings; and
provide a power supply control signal at the first terminal of the battery measurement circuit, wherein the power supply control signal controls a voltage level of the supply voltage generated by the power supply such that the battery management circuit draws small and short duration current from the at least one of the one or more battery strings during a battery discharge operation.

2. The battery management circuit of claim 1 wherein the one or more characteristics include a voltage of one or more batteries in the at least one of the one or more battery strings.

3. The battery management circuit of claim 2 wherein said battery measurement circuit determines state of charge (SOC) and/or state of health (SOH) characteristics of the one or more batteries in response to the measured voltage and the current sensing signal.

4. The battery management circuit of claim 1 wherein the voltage level of the supply voltage is further adjusted such that a predetermined amount of current is supplied to the one or more battery strings to substantially reduce or eliminate corrosion of the one or more battery strings.

5. The battery management circuit of claim 4 wherein the predetermined amount of current is supplied for a predetermined time period.

6. The battery management circuit of claim 4 wherein an increase in the voltage level of the supply voltage provides a corresponding increase in the predetermined amount of current supplied to the one or more battery strings, and a decrease in the voltage level of the supply voltage provides a corresponding decrease in the predetermined amount of current supplied to the one or more battery strings.

7. The battery management circuit of claim 1 further comprising:
a temperature sensing circuit having a terminal coupled to a fourth terminal of said battery measurement circuit, said temperature sensing circuit configured to measure ambient temperature proximate to the one or more battery strings and in response thereto provide a temperature sensing signal indicative of the measured ambient temperature to the battery measurement circuit at the temperature sensing circuit terminal, wherein the power supply control signal is generated in response to at least one of the temperature sensing signal, the current sensing signal and the one or more characteristics measured by the battery measurement circuit.

8. The battery management circuit of claim 1 wherein said battery measurement circuit includes an analog-to-digital converter (ADC), said ADC coupled to receive a voltage signal from each of the batteries in the at least one of the one or more battery strings and configured to provide a corresponding converted digital signal indicative of a voltage of the batteries.

9. The battery management circuit of claim 1 wherein said battery measurement circuit is provided as part of a controller and said controller is configured to provide the power supply control signal.

10. The battery management circuit of claim 1 further comprising:
a switching circuit having a first terminal coupled to the first terminal of the battery management circuit, a second terminal coupled to the first terminal of said current sensing circuit, and a third, control terminal, wherein said switching circuit is coupled to receive the current signal from the at least one of the one or more battery strings at the first terminal and configured to provide the current signal to the current sensing circuit at the second terminal, and wherein a control signal corresponding to at least one of the current sensing signal and a battery measurement signal corresponding one or more of the characteristics measured by the battery measurement circuit controls current flow through the first and second terminals of said switching circuit.

11. The battery management circuit of claim 10 wherein said switching circuit comprises a field-effect transistor (FET) having a source terminal, a drain terminal and a gate terminal, wherein the source terminal corresponds to the first terminal of said switching circuit, the drain terminal corresponds to the second terminal of said switching circuit, and the gate terminal corresponds to the third terminal of said switching circuit.

12. The battery management circuit of claim 10 further comprising:
at least one diode having a positive terminal and a negative terminal, wherein the positive terminal is coupled to the first terminal of said switching circuit and the negative terminal is coupled to the second terminal of said switching circuit.

13. The battery management circuit of claim 10 wherein said switching circuit is provided as at least one of a power switch, a switching semiconductor, an electromechanical relay and an electromechanical contactor.

14. The battery management circuit of claim 1 wherein said battery measurement circuit is coupled to the power supply in a closed loop arrangement.

15. The battery management circuit of claim 14 wherein the one or more battery strings is a single battery string and the voltage level of the supply voltage is controlled such that the battery management circuit is capable of substantially eliminating current flow through the single battery string without a switching circuit.

16. The battery management circuit of claim 10 wherein the battery management circuit is coupled to two or more battery strings.

17. The battery management circuit of claim 16 wherein said battery measurement circuit is coupled to the power supply in a closed loop arrangement and said switching circuit isolates each battery string of the two or more battery strings from the power supply.

18. The battery management circuit of claim 1 wherein the battery measurement circuit uses the small and short duration current to determine the characteristics of the at least one of the one or more battery strings.

19. The battery management circuit of claim 1 wherein the battery measurement circuit uses the small and short duration current to determine an internal resistance of the at least one of the one or more battery strings.

20. The battery management circuit of claim 1 wherein the battery management circuit draws a current of between 0.5 to 1.5 amps for less than ten seconds from the at least one of the one or more battery strings during the battery discharge operation.

21. In a system including a power supply configured to generate a supply voltage, an electrical load configured to receive the supply voltage, and one or more battery strings comprising at least one battery, a battery management circuit for managing the power supply and the one or more battery strings, the battery management circuit having first and second terminals coupled to first and second opposing terminals of the power supply and first and second opposing terminals of the electrical load, and having third and fourth terminals coupled to first and second opposing terminals of the one or more battery strings, and having a fifth terminal coupled to a control terminal of the power supply, the battery management circuit comprising:
a current sensing circuit having a first terminal coupled to the first terminal of the battery management circuit, a second terminal coupled to the third terminal of the battery management circuit, and a third terminal, said current sensing circuit configured to:
receive a current signal from at least one of the one or more battery strings at the first terminal;
measure a magnitude of the current signal; and
provide a current sensing signal indicative of the magnitude of the current signal at the third terminal; and
a battery measurement circuit having a first terminal coupled to the fifth terminal of the battery management circuit, a second terminal coupled to the third terminal of said current sensing circuit, and at least a third terminal adapted to couple to the first and second terminals of the at least one of the one or more battery strings, said battery measurement circuit configured to:
receive the current sensing signal at the third terminal;
measure one or more characteristics of the at least one of the one or more battery strings; and
provide a power supply control signal at the first terminal of the battery measurement circuit, wherein the power supply control signal controls a voltage level of the supply voltage generated by the power supply to cause the battery management circuit to draw small and short duration current from the at least one of the one or more battery strings during a battery discharge operation such that the battery discharge operation is performed using voltage control in closed loop manner between the said battery measurement circuit and the power supply.

* * * * *